(12) United States Patent
Kobayashi et al.

(10) Patent No.: US 12,556,842 B2
(45) Date of Patent: Feb. 17, 2026

(54) SEMICONDUCTOR DEVICE

(71) Applicant: Canon Kabushiki Kaisha, Tokyo (JP)

(72) Inventors: Masahiro Kobayashi, Tokyo (JP); Yasuharu Ota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 817 days.

(21) Appl. No.: 17/949,338

(22) Filed: Sep. 21, 2022

(65) Prior Publication Data
US 2023/0120836 A1   Apr. 20, 2023

(30) Foreign Application Priority Data

Oct. 20, 2021   (JP) .................................. 2021-171585

(51) Int. Cl.
H04N 25/773 (2023.01)
H10F 55/20 (2025.01)
H10F 77/00 (2025.01)

(52) U.S. Cl.
CPC ........... H04N 25/773 (2023.01); H10F 55/26 (2025.01); H10F 77/959 (2025.01)

(58) Field of Classification Search
None
See application file for complete search history.

(56) References Cited

U.S. PATENT DOCUMENTS

| 2020/0240837 | A1* | 7/2020 | Ota | H04N 25/77 |
| 2020/0244909 | A1* | 7/2020 | Morimoto | H10F 77/953 |
| 2024/0027585 | A1* | 1/2024 | Morikawa | G01S 7/4915 |

FOREIGN PATENT DOCUMENTS

JP    2020123847 A    8/2020

* cited by examiner

Primary Examiner — Twyler L Haskins
Assistant Examiner — Wesley J Chiu
(74) Attorney, Agent, or Firm — Venable LLP

(57) ABSTRACT

The disclosed semiconductor device includes a region provided with a plurality of circuit blocks each including an avalanche photodiode. A part of the plurality of circuit blocks is a pixel circuit further including a first control circuit configured to control the avalanche photodiode to a standby state in which an avalanche multiplication is possible and a recharging state in which the avalanche photodiode is returned to a state in which the avalanche multiplication is possible after the avalanche multiplication occurs, in response to the first control signal, and another part of the plurality of circuit blocks is a signal generation circuit configured to generate a signal corresponding to a waveform of the first control signal. The signal generation circuit is configured not to output a signal corresponding to the output of the avalanche photodiode.

14 Claims, 17 Drawing Sheets

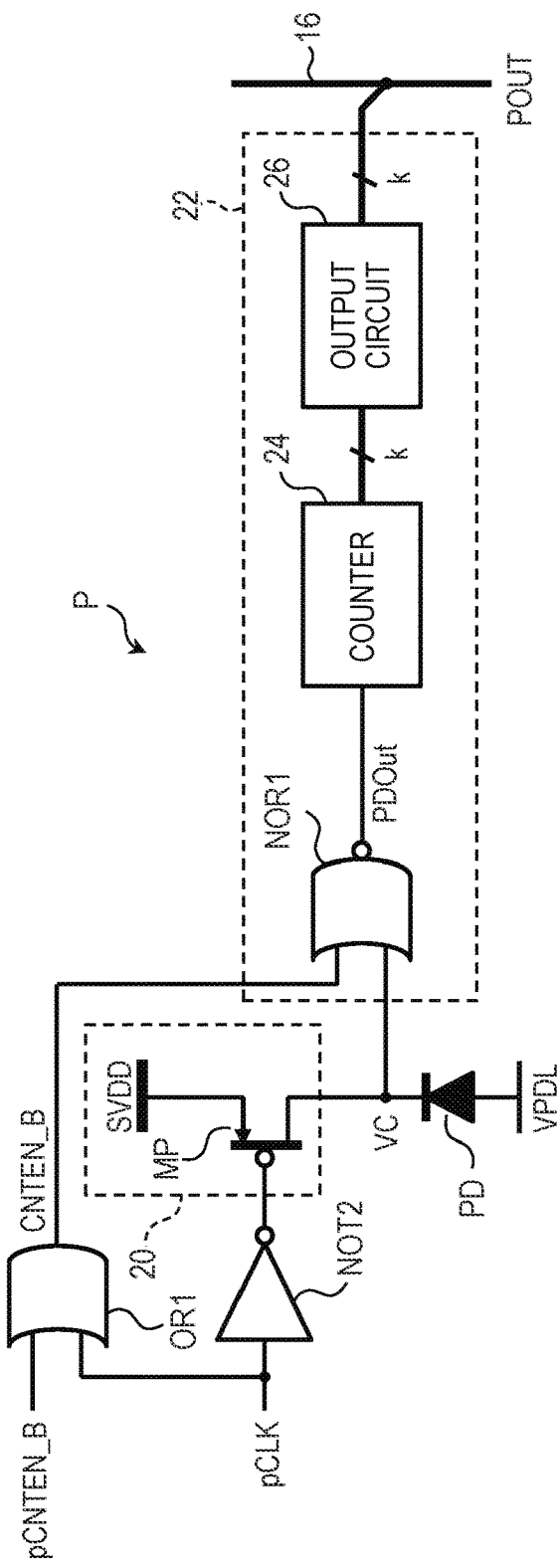
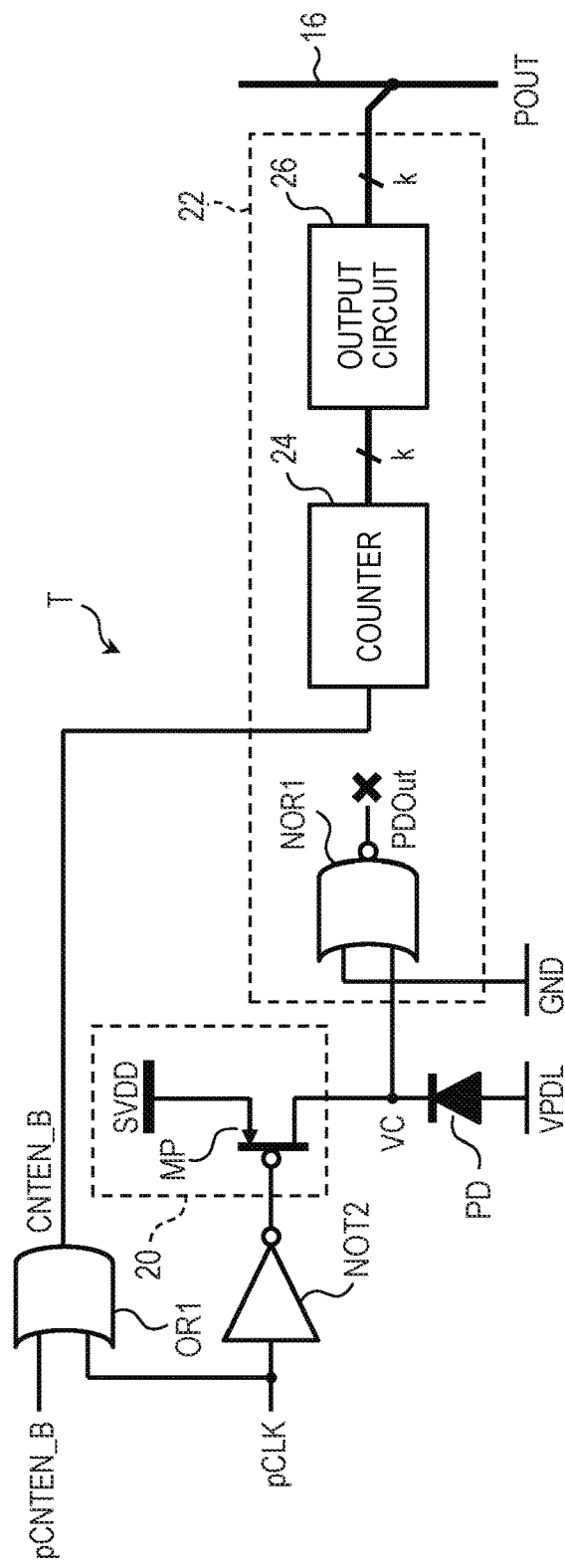
FIG. 6A
FIG. 6B

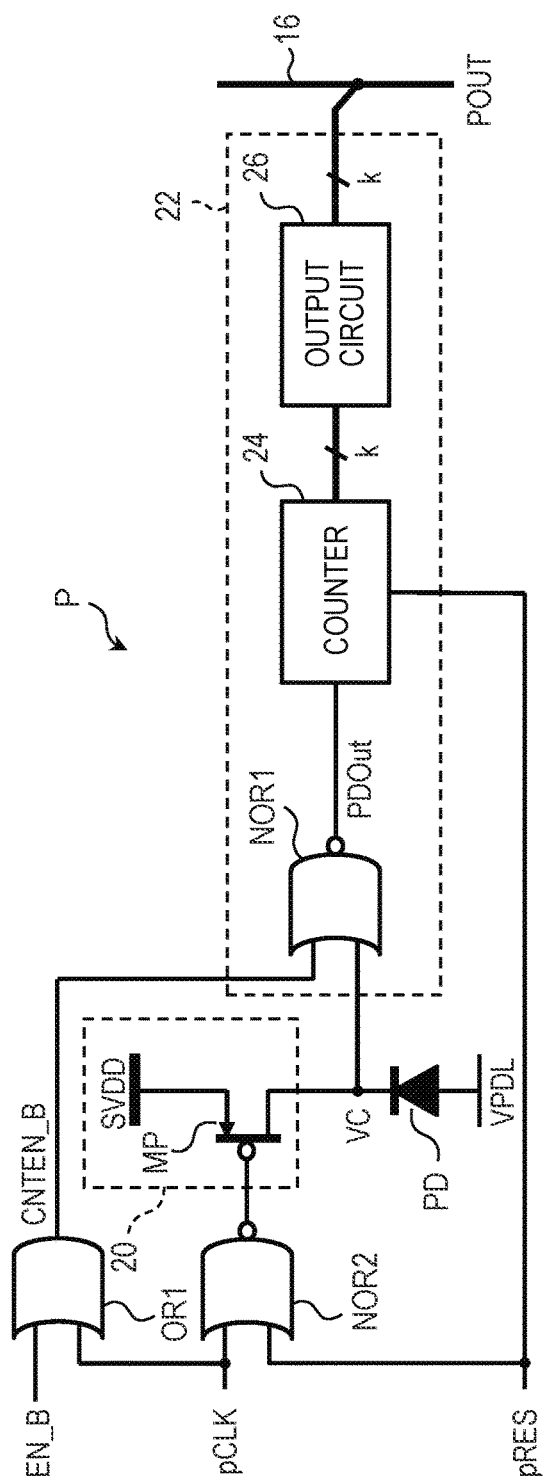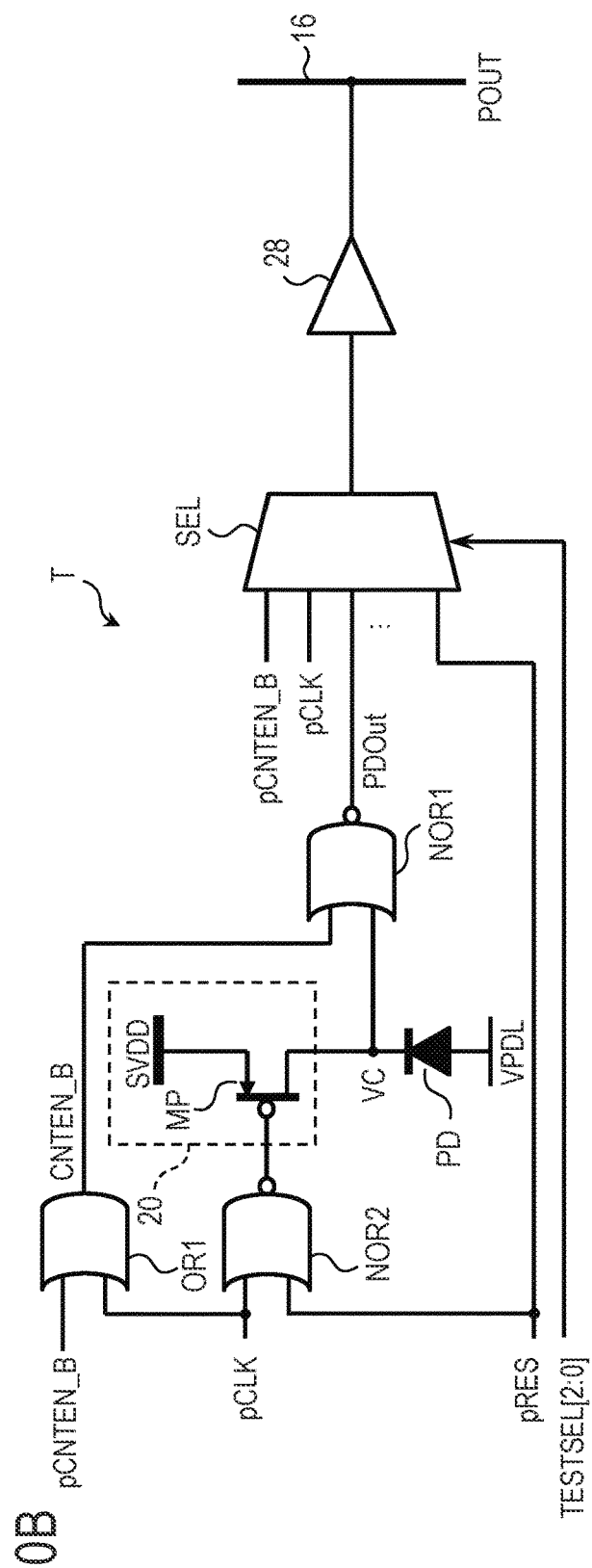
FIG. 10A
FIG. 10B

SEMICONDUCTOR DEVICE

BACKGROUND OF THE INVENTION

Field of the Invention

The present invention relates to a semiconductor device.

Description of the Related Art

There is known a semiconductor device that outputs a digital signal according to a count value of photons incident on a photoelectric conversion element such as an avalanche photodiode. Japanese Patent Application Laid-Open No. 2020-123847 discloses a semiconductor device having a pixel region in which a plurality of pixels, each of which outputs a digital signal corresponding to a photon reception frequency, are two-dimensionally arranged. Each of the plurality of pixels disclosed in Japanese Patent Application Laid-Open No. 2020-123847 includes an avalanche photodiode and a control circuit that controls the avalanche photodiode to be in a standby state in which avalanche multiplication can be performed and a recharged state in which avalanche multiplication can be performed again.

However, in the semiconductor device described in Japanese Patent Application Laid-Open No. 2020-123847, when the number of pixels arranged increases and the load of the control signal increases, there is a possibility that the frequency and phase of the control signal change due to the variation of the elements of each pixel or the difference in the arrangement location, and a desired pixel output cannot be obtained. In the case where there is a plurality of control signals, it is preferable to determine which control signals affect the operation of the pixel using a test circuit, and to correct or change the control signals as necessary. However, in order to arrange the test circuit in the circuit region of the pixel, the size of the pixel must be increased, and there is a concern that the number of pixels arranged cannot be increased.

SUMMARY OF THE INVENTION

An object of the present invention is to provide a technology for stabilizing operation of a semiconductor device.

According to an embodiment of the present disclosure, there is provided a semiconductor device including a region provided with a plurality of circuit blocks each including an avalanche photodiode, wherein a part of the plurality of circuit blocks is a pixel circuit that further includes a first control circuit configured to control the avalanche photodiode to a standby state in which an avalanche multiplication is possible and a recharging state in which the avalanche photodiode is returned to a state in which the avalanche multiplication is possible after the avalanche multiplication occurs, according to a first control signal, wherein another part of the plurality of circuit blocks is a signal generation circuit configured to generate a signal according to a waveform of the first control signal, and wherein the signal generation circuit is configured not to output a signal corresponding to an output of the avalanche photodiode.

According to another embodiment of the present disclosure, there is provided a semiconductor device including a region provided with a plurality of circuit blocks each including an avalanche photodiode, wherein a part of the plurality of circuit blocks is a pixel circuit that further includes a first control circuit configured to control the avalanche photodiode to a standby state in which an avalanche multiplication is possible and a recharging state in which the avalanche photodiode is returned to a state in which the avalanche multiplication is possible after the avalanche multiplication occurs, and a second control circuit configured to control the number of periods during which the avalanche multiplication occurs in the avalanche photodiode among periods defined by intervals of pulses on the first control signal, and wherein another part of the plurality of circuit blocks is a signal generation circuit that further includes a selection circuit that selects and outputs one of the first control signal and a signal different from the first control signal in response to a third control signal.

Further features of the present invention will become apparent from the following description of exemplary embodiments with reference to the attached drawings.

BRIEF DESCRIPTION OF THE DRAWINGS

FIG. 6A is a diagram illustrating a configuration example of a pixel circuit in a semiconductor device according to a second embodiment of the present invention.

FIG. 6B is a diagram illustrating a configuration example of a signal generation circuit in the semiconductor device according to the second embodiment of the present invention.

FIG. 10A is a diagram illustrating a configuration example of a pixel circuit in a semiconductor device according to a fourth embodiment of the present invention.

FIG. 10B is a diagram illustrating a configuration example of a signal generation circuit in the semiconductor device according to the fourth embodiment of the present invention.

DESCRIPTION OF THE EMBODIMENTS

Figure 1:
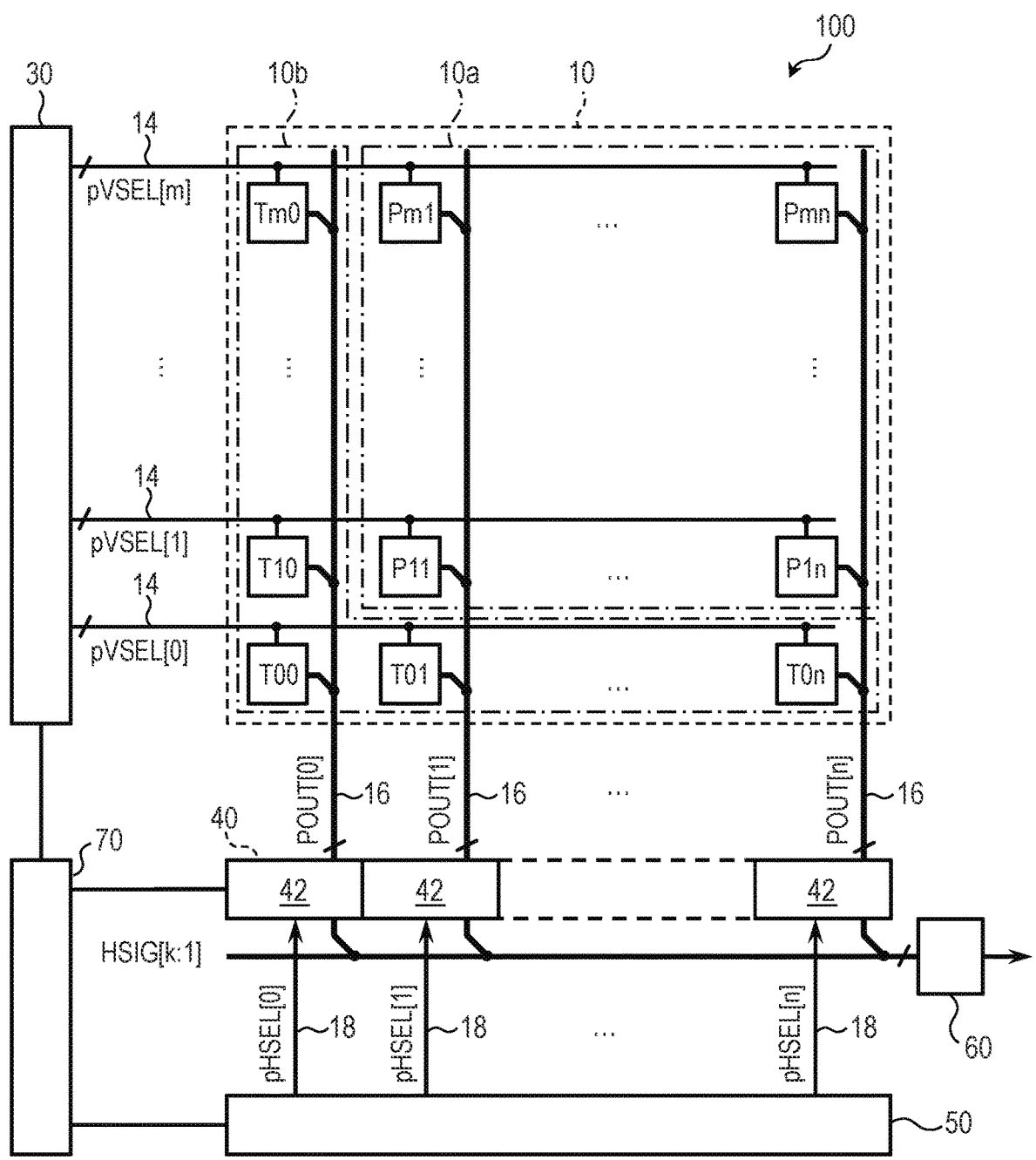
FIG. 1 and FIG. 2 are block diagrams illustrating a schematic configuration of a semiconductor device according to a first embodiment of the present invention.

Preferred embodiments of the present invention will now be described in detail in accordance with the accompanying drawings. In the drawings, the same or corresponding elements are denoted by the same reference numerals, and the description thereof may be omitted or simplified.

In the following first to fourth embodiments, an imaging device will be mainly described as an example of a semiconductor device. However, the semiconductor device to which the configuration of each embodiment may be applied is not limited to the imaging device, and may be applied to other examples of the semiconductor device. Examples of the semiconductor device to which the present invention may be applied include a memory device typified by DRAM (Dynamic Random Access Memory) and NVM (Non-Volatile Memory), and a photoelectric conversion device. Examples of the photoelectric conversion device include an imaging device described below, a distance measurement device (a device for distance measurement using focus detection, TOF (Time Of Flight), and the like), and a photometric device (a device for measuring the amount of incident light).

First Embodiment

Figure 2:
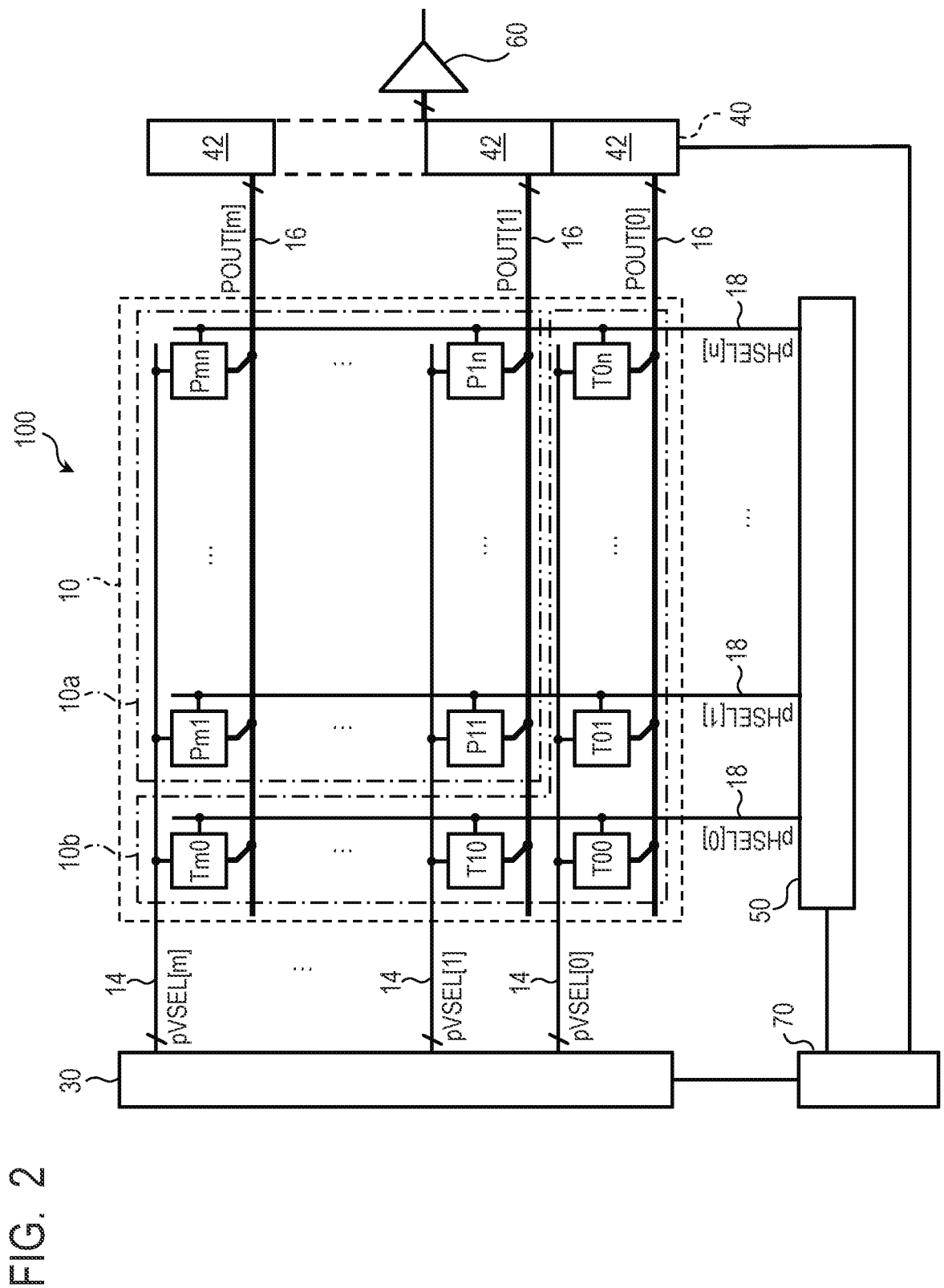
Figure 3A:
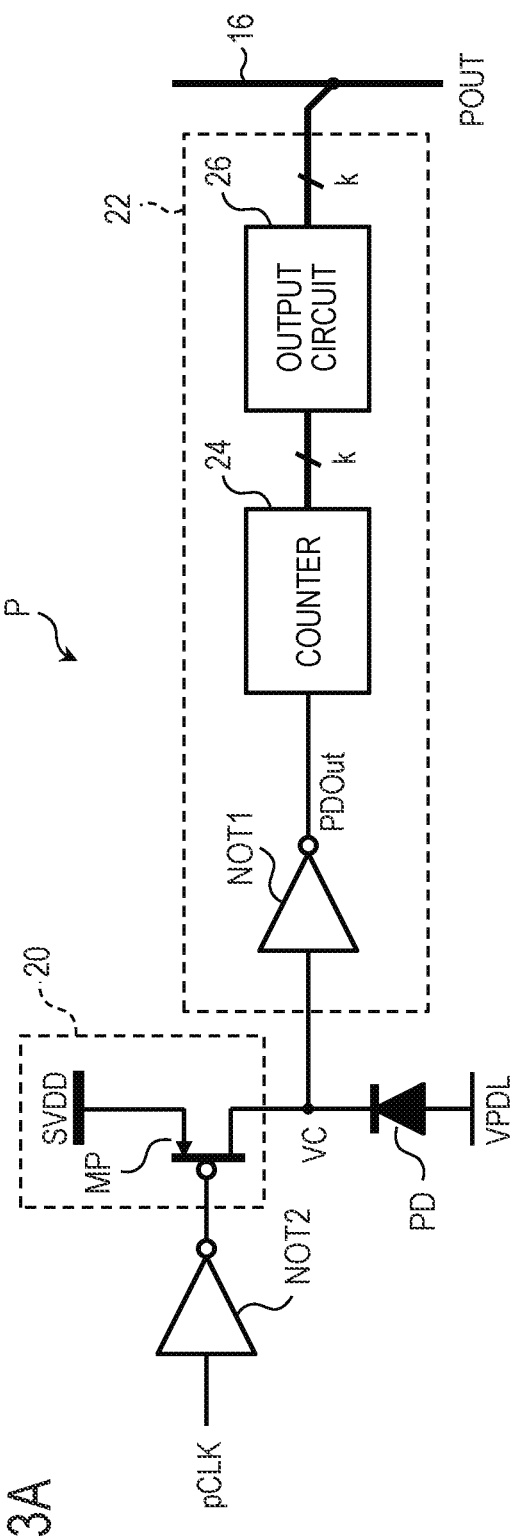
FIG. 3A is a diagram illustrating a configuration example of a pixel circuit in the semiconductor device according to the first embodiment of the present invention.
Figure 3B:
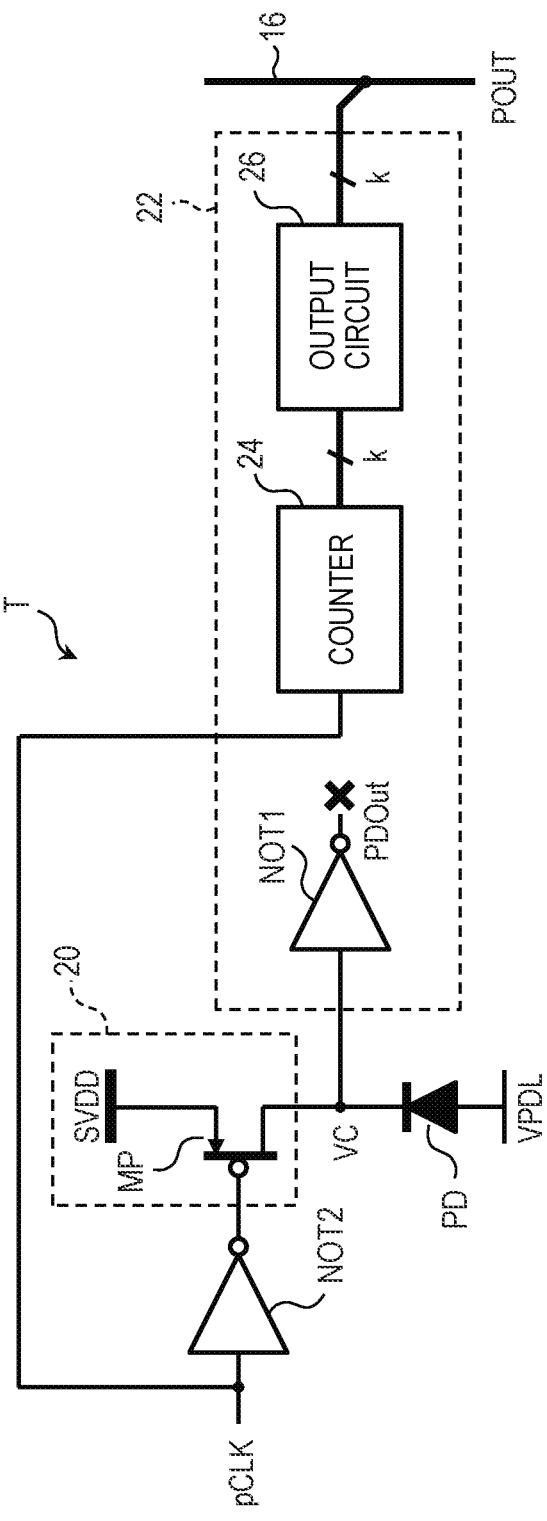
FIG. 3B is a diagram illustrating a configuration example of a signal generation circuit in the semiconductor device according to the first embodiment of the present invention.
Figure 4:
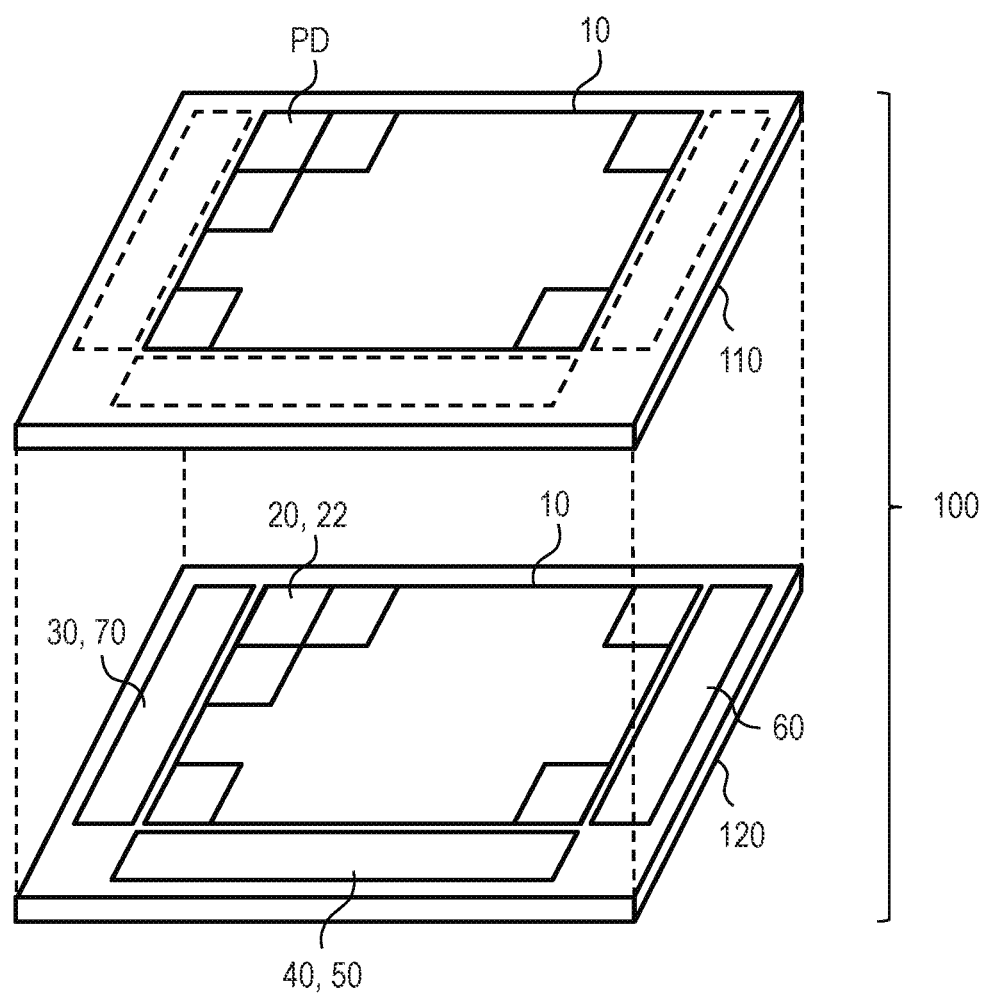
FIG. 4 is a perspective view illustrating a configuration example of the semiconductor device according to the first embodiment of the present invention.
Figure 5:
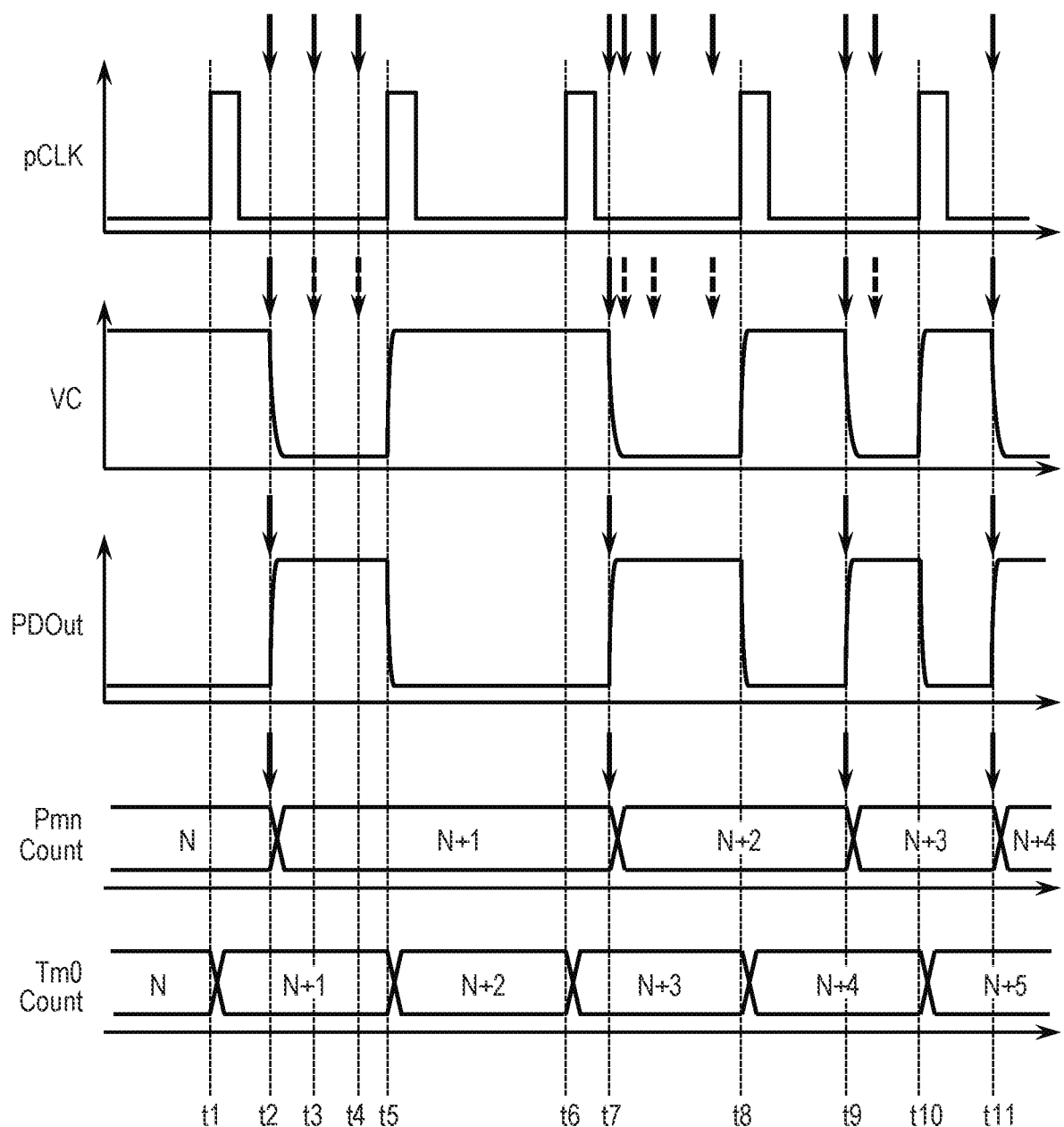
FIG. 5 is a timing chart illustrating the operation of the semiconductor device according to the first embodiment of the present invention.

A semiconductor device according to a first embodiment of the present invention will be described with reference to FIG. 1 to FIG. 5. FIG. 1 and FIG. 2 are block diagrams illustrating a schematic configuration of a semiconductor device according to the present embodiment. FIG. 3A is a diagram illustrating a configuration example of a pixel circuit in the semiconductor device according to the present embodiment. FIG. 3B is a diagram illustrating a configuration example of a signal generation circuit in the semiconductor device according to the present embodiment. FIG. 4 is a perspective view illustrating a configuration example of the semiconductor device according to the present embodiment. FIG. 5 is a timing chart illustrating the operation of the semiconductor device according to the present embodiment.

First, the structure of the semiconductor device according to the present embodiment will be described with reference to FIG. 1 to FIG. 4. As illustrated in FIG. 1, the semiconductor device 100 according to the present embodiment includes a pixel region 10, a vertical selection circuit 30, a signal processing circuit 40, a horizontal selection circuit 50, an output unit 60, and a control unit 70.

In the pixel region 10, a plurality of circuit blocks arranged two-dimensionally across a plurality of rows and a plurality of columns are provided. FIG. 1 illustrates a case where the pixel region 10 includes (m+1)×(n+1)-number of circuit blocks arranged in (m+1)-number of rows from 0-th row to m-th row and (n+1)-number of columns from 0-th column to n-th column. A part of the plurality of circuit blocks is a pixel circuit P, and another part of the plurality of circuit blocks is a signal veneration circuit T. In FIG. 1, pixel circuits P and signal generation circuits T are shown together with reference numerals indicating a row number and a column number. For example, a pixel circuit P arranged in a first row and a first column is denoted by a reference numeral "P11". A signal generation circuit T arranged in a 0-th row and a first column is denoted by a reference numeral "T01".

The pixel region 10 includes a first pixel region 10a in which the pixel circuits P are disposed and a second pixel region 10b in which the signal generation circuits T are disposed. The pixel circuits P may be two-dimensionally arranged over a plurality of rows and a plurality of columns. The signal generation circuit T may be arranged in at least one row and/or one column of the plurality of rows and the plurality of columns constituting the pixel region 10. In the configuration example of FIG. 1, the first pixel region 10a is composed of (m×n)-number of pixel circuits P arranged in m-number of rows from the 1st row to the m-th row and n-number of columns from the 1st column to the n-th column. In the configuration example of FIG. 1, the second pixel region 10b includes (m+n+1)-number of signal generation circuits T arranged from the 0-th column to the n-th column of the 0-th row and from the 1st row to the m-th row of the 0-th column. The number of rows and columns of the pixel circuits P constituting the first pixel region 10a and the number of rows and columns of the signal generation circuit T constituting the second pixel region 10b are not particularly limited.

As described above, in the semiconductor device 100 according to the present embodiment, each of the plurality of rows and the plurality of columns constituting the pixel region 10 includes at least one signal generation circuit T. At least one row and one column of the plurality of rows and the plurality of columns constituting the pixel region 10 may be constituted by only the signal generation circuit T. The second pixel region 10b is preferably arranged along two sides around the first pixel region 10a, for example, as illustrated in FIG. 1.

In a typical photoelectric conversion device, an optical black pixel (OB pixel) for generating a reference signal or a dummy pixel fix maintaining structural periodicity may be disposed around a pixel (effective pixel) for outputting a signal used as an image signal. In such a case, the signal generation circuit T may utilize a part of the OB pixel or the dummy pixel. Similarly to the OB pixel, the signal generation circuit T may be configured to be optically shielded by a light shielding layer or the like.

In each row of the pixel region 10, a control line 14 is arranged so as to extend in a first direction (lateral direction in FIG. 1). The control line 14 is connected to the pixel circuits P and/or the signal generation circuits T arranged in the first direction, respectively, and serves as a common signal line to these circuits. The first direction in which the control line 14 extends may be denoted as a row direction or a horizontal direction. In FIG. 1, a control signal pVSEL, which is one of the control signals supplied via the control line 14 of each row, is shown together with a symbol indicating a row number. For example, the control signal pVSEL supplied to the control line 14 of the 1st row is denoted by "pVSEL[1]". Each of the control lines 14 may include a plurality of signal lines for supplying a plurality of kinds of control signals to the pixel circuit P and the signal generation circuit T.

In each column of the pixel region 10, an output line 16 is arranged so as to extend in a second direction (vertical direction in FIG. 1) intersecting with the first direction. The output line 16 is connected to the pixel circuit P and the signal generation circuit T arranged in the second direction, and serves as a common signal line to these circuits. The second direction in which the output line 16 extends may be referred to as a column direction or a vertical direction. In FIG. 1, a signal POUT output to the output line 16 of each column is shown together with a symbol indicating a column number. For example, a signal POUT output to the output line 16 of the 1st column is denoted by a symbol "POUT [1]". When the signal POUT output from the pixel circuit P and the signal generation circuit T is a k-bit signal, each of the output lines 16 may include k-number of signal lines for outputting k-bit digital signals.

The control line 14 of each row is connected to the vertical selection circuit 30. The vertical selection circuit 30 is a circuit unit that receives a control signal output from the control unit 70, generates the control signals pVSEL for driving the pixel circuits P and the signal generation circuits T and supplies the control signals pVSEL to the pixel circuits P and/or the signal generation circuits T via the control lines 14. A logic circuit such as a shift register or an address decoder may be used as the vertical selection circuit 30. The vertical selection circuit 30 sequentially scans the pixel circuits P and the signal generation circuits T in the pixel region 10 in units of rows, and outputs signals of the pixel circuits P and the signal generation circuits T to the output lines 16 of the respective columns.

The signal processing circuit 40 includes a plurality of processing circuits 42 corresponding to each column. The output line 16 of each column is connected to the processing circuit 42 of the corresponding column. The processing circuit 42 of each column has a function of holding a signal POUT output from the pixel circuit P or the signal generation circuit T of the corresponding column via the output line 16. For example, when the signal POUT output from the pixel circuit P or the signal generation circuit T is a k-bit digital signal, each of the processing circuits 42 includes at least k-number of holding units.

The horizontal selection circuit 50 is a circuit unit that receives a control signal output from the control unit 70, generates control signals pHSEL for reading out signals from the signal processing circuit 40, and supplies the control signals to the signal processing circuit 40. A logic circuit such as a shift register or an address decoder may be used as the horizontal selection circuit 50. The horizontal selection circuit 50 sequentially scans the processing circuits 42 of the respective columns by sequentially supplying the control signals pHSEL to the processing circuits 42 of the respective columns via, the control line 18, and sequentially outputs the signals held in the respective holding units to the horizontal output lines HSIG. In FIG. 1, the control signals pHSEL supplied from the control line 18 are shown together with a symbol indicating a column number. For example, the control signal pHSEL supplied from the control line 18 in the n-th column is denoted by "pHSEL[n]". The horizontal output line HSIG includes at least k-number of signal lines for outputting k-bit digital signals.

The output remit 60 includes an external interface circuit, and outputs the signal supplied via the horizontal output line HSIG to an outside of the semiconductor device 100 as an output signal SOUT. The external interface circuit included in the Output unit 60 is not particularly limited. For example, SerDes (SERializer/DESerializer) transmission circuits such as LVDS (Low Voltage Differential Signaling) circuit and SLVS (Scalable Low Voltage Signaling) circuit may be applied to the external interface circuit.

The control unit 70 is a circuit unit for supplying control signals for controlling operations of the vertical selection circuit 30, the signal processing circuit 40, the horizontal selection circuit 50, and the output unit 60 and timing thereof. At least a part of the control signals for controlling the operation and timing of the vertical selection circuit 30, the signal processing circuit 40, the horizontal selection circuit 50, and the output unit 60 may be supplied from the outside of the semiconductor device 100.

Note that the connection mode of each functional block of the semiconductor device 100 is not limited to the configuration example of FIG. 1, and may be configured as illustrated in FIG. 2, for example.

In the configuration example of FIG. 2, an output line 16 extending in the first direction are arranged in each row of the pixel region 10. The output line 16 is connected to the pixel circuits P and/or the signal generation circuits T arranged in the first direction, respectively, and serve as signal lines common to these pixel circuits P and/or the signal generation circuits T. In addition, a control line 18 extending in the second direction is arranged in each column of the pixel region 10. The control line 18 is connected to the pixel circuits P and/or the signal generation circuits T arranged in the second direction, respectively, and serves as a common signal line for these pixel circuits P and/or the signal generation circuits T.

The control line 18 in each column is connected to the horizontal selection circuit 50. The horizontal selection circuit 50 receives a control signal output from the control unit 70, generates control signals pHSEL for reading out pixel signals from the pixel circuits P and/or the signal generation circuits L and supplies the control signals to the pixel circuits P and/or the signal generation circuits T via the control lines 18. Specifically, the horizontal selection circuit 50 sequentially scans the pixel circuits P and/or the signal generation circuits T of the pixel region 10 in units of columns, and outputs signals of the pixel circuits P and/or the signal generation circuits T of each row belonging to the selected column to the output lines 16.

The output line 16 of each row is connected to the signal processing circuit 40. The signal processing circuit 40 includes a plurality of processing circuits 42 provided corresponding to each row of the pixel region 10. Each of the processing circuits 42 has a function of holding a signal of the pixel circuit P or the signal generation circuit T of each row output from the pixel region 10 in units of columns via the output line 16 of the corresponding row in the holding unit.

The signal processing circuit 40 receives the control signal output from the control unit 70 and sequentially outputs the signals held in the holding unit of the processing circuit 42 of each row to the output unit 60.

Other configurations in the configuration example of FIG. 2 may be similar to those in the configuration example of FIG. 1.

FIG. 3A is a diagram illustrating a configuration example of the pixel circuit P in the semiconductor device according to the present embodiment. The pixel circuit P is a circuit block that outputs a signal corresponding to incident light. As illustrated in FIG. 3A, each of the pixel circuits P includes a photodiode PD, a logic circuit NOT2, a first control circuit 20, and a second control circuit 22. The first control circuit 20 includes a PMOS transistor MP. The second control circuit 22 includes a logic circuit NOT1, a counter 24, and an output circuit 26. The logic circuits NOT1 and NOT2 may be constituted by NOT circuits (inverter circuits). The logic circuit NOT2 does not necessarily have to be included in each pixel circuit P, and may be, for example, a part of the vertical selection circuit 30 or the control unit 70. In this case, the output signal of the logic circuit NOT2 is supplied to the first control circuit 20 via the control line 14.

A cathode of the photodiode PD is connected to one of a source and a drain of the PMOS transistor MP and an input node of the logic circuit NOT1. A gate of the PMOS transistor MP is connected to an output node of the logic circuit NOT2. An output node of the logic circuit NOT1 is connected to an input node of the counter 24. An output node of the counter 24 is connected to an input node of the output circuit 26. An output node of the output circuit 26 is connected to the output line 16. A voltage VPDL is applied to an anode of the photodiode PD. A first control signal pCLK generated by a pulse generation circuit (not illustrated) provided outside the pixel circuit P is input to an input node of the logic circuit NOT2 via a control line 14. That is, a signal obtained by inverting the first control signal pCLK is input to the gate of the PMOS transistor MP. A voltage SVDD is applied to the other of the source and the drain of the PMOS transistor MP. In the present embodiment, the voltage SVDD is about 3.3 V, and the voltage VPDL is about −20 V. The first control signal pCLK is a signal (clock signal) including pulses of a predetermined period.

The first control circuit 20 has a function of controlling the operation of the photodiode PD. More specifically, the first control circuit 20 has a function of controlling the photodiode PD to a standby state in which the avalanche multiplication may be performed and a recharging state in which the photodiode PD returns to a state in which the avalanche multiplication may be performed again after the avalanche multiplication occurs, according to the first control signal pCLK. When the PMOS transistor MP is turned on according to the level of the first control signal pCLK, a reverse bias voltage of a potential difference between the voltage SVDD and the voltage VPDL is applied to the photodiode PD. By setting the reverse bias voltage to a voltage higher than the breakdown voltage of the photodiode PD, the photodiode PD operates as an avalanche photodiode of a Geiger mode.

The logic circuit NOT1 has a function of converting an output signal of the photodiode PD into a pulse signal suitable for a digital circuit in a subsequent stage. The logic circuit NOT1 includes an inverter circuit, and outputs a signal PDOut obtained by inverting the level of the signal VC of the cathode portion corresponding to the output of the photodiode PD to the counter 24.

The counter 24 has a function of counting the number of times the output (signal PDOut) of the logic circuit NANDI transits from Low level to High level. Thus, the counter 24 generates a k-bit count signal having a count value corresponding to the incidence of photons on the photodiode PD.

The output circuit 26 has a function of receiving a k-bit count signal output from the counter 24 and outputting the count signal (signal POUT) to the output line 16. The output circuit 26 may rearrange the signals as appropriate. The signal output from the output circuit 26 may be a differential signal.

FIG. 3B is a diagram illustrating a configuration example of the signal generation circuit T in the semiconductor device according to the present embodiment. The signal generation circuit T is a circuit block that outputs a signal according to a waveform of a control signal. The signal generation circuit T includes the same circuit elements as the circuit elements constituting the pixel circuit P. That is, each signal generation circuit T includes a photodiode PD, a logic circuit NOT2, a first control circuit 20, and a second control circuit 22, as illustrated in FIG. 3B. The first control circuit 20 includes a PMOS transistor MP. The second control circuit 22 includes a logic circuit NOT1, a counter 24, and an output circuit 26. The logic circuits NOT1 and NOT2 may be constituted by NOT circuits (inverter circuits). The logic circuit NOT2 does not necessarily have to be included in each signal generation circuit T, and may be, for example, a part of the vertical selection circuit 30 or the control unit 70. In this case, the output signal of the logic circuit NOT2 is supplied to the first control circuit 20 via the control line 14 or the like. The signal generation circuit T differs from the pixel circuit P in that the input node of the counter 24 is isolated from the output node of the logic circuit NOT1, and instead, the first control signal pCLK is input to the input node of the counter 24. That is, the photodiode PD and the second control circuit 22 of the signal generation circuit T are electrically disconnected from each other, and a signal corresponding to the output of the photodiode PD is not output to the counter 24. Note that although an interconnection between the logic circuit NOT1 and the counter 24 is cut and not electrically connected, an interconnection between the counter 24 and the output circuit 26 may be cut and not electrically connected. In addition, an interconnection between the output circuit 26 and the output line 16 may be cut so as not to be electrically connected. Further, an interconnection between the logic circuit NOT1 and the cathode portion of the photodiode PD may be cut so as not to be electrically connected. In addition, a switch may be provided in addition to disconnecting the interconnection so as not to be electrically connected.

By configuring the signal generation circuit T in this manner, the signal generation circuit T may count the number of times the first control signal pCLK transits from the Low level to the High level by the counter 24 and output the count to the output line 16.

The semiconductor device 100 according to the present embodiment may be formed on one substrate, or may be formed as a stacked-type semiconductor device in which a plurality of substrates is stacked. In the latter case, for example, as illustrated in FIG. 4, a stacked-type semiconductor device in which a sensor substrate 110 and a circuit substrate 120 are stacked and electrically connected may be configured. At least the photodiode PD among the components of the pixel circuit P and the signal generation circuit T may be disposed on the sensor substrate 110. Further, the first control circuit 20 and the second control circuit 22 among the components of the pixel circuit P and the signal generation circuit T may be disposed on the circuit substrate 120. The photodiode PD and the first control circuit 20 and the second control circuit 22 may be electrically connected to each other via connection interconnections provided for each pixel circuit P and each signal generation circuit T. The circuit substrate 120 may further include a vertical selection circuit 30, a signal processing circuit 40, a horizontal selection circuit 50, an output unit 60, and a control unit 70.

The photodiode PD, and the first control circuit 20 and the second control circuit 22 of each of the pixel circuit P and the signal generation circuit T may be provided on the sensor substrate 110 and the circuit substrate 120 so as to overlap each other in a plan view. The vertical selection circuit 30, the signal processing circuit 40, the horizontal selection circuit 50, the output unit 60, and the control unit 70 may be disposed around the pixel region 10.

In this specification, the term "plan view" refers to a view from a direction perpendicular to the light incident surface of the sensor substrate 110. Further, the "cross section" indicates a cross section in a direction perpendicular to the light incident surface of the sensor substrate 110.

By configuring the stacked-type semiconductor device 100, the degree of integration of elements may be increased and high functionality may be achieved. In particular, by disposing the photodiode PD and the first control circuit 20 and the second control circuit 22 on different substrates, the photodiode PD may be disposed at a high density without sacrificing the light receiving area of the photodiode PD, and the photon detection efficiency may be improved.

The number of substrates constituting the semiconductor device 100 is not limited to two, and the semiconductor device 100 may be formed by stacking three or more substrates.

Although FIG. 4 assumes a chip diced as the sensor substrate 110 and the circuit substrate 120, the sensor substrate 110 and the circuit substrate 120 are not limited to the chip. For example, each of the sensor substrate 110 and the circuit substrate 120 may be a wafer. In addition, the sensor substrate 110 and the circuit substrate 120 may be stacked in a wafer state and then diced, or may be stacked and bonded after the sensor substrate 110 and the circuit substrate 120 are formed into chips.

Next, the operation of the semiconductor device 100 according to the present embodiment will be described with reference to FIG. 5. FIG. 5 is a timing chart illustrating the operation of the pixel circuit P and the signal generation circuit T illustrated in FIG. 3A and FIG. 3B. In FIG. 5, "Pmn Count" denotes a count value of the counter 24 of the pixel circuit Pmn, and "Tm0 Count" denotes a count value of the counter 24 of the signal generation circuit Tm0. The other signals illustrated in FIG. 5 correspond to the signals illustrated in the respective portions of FIG. 3A and FIG. 3B. FIG. 5 further illustrates the timing at which photons enter the photodiode PD by arrows in the upper part of the signal waveform.

First, the operation of the pixel circuit P will be described below by taking the pixel circuit Pmn in the m-th row and the n-th column as an example.

Immediately before time t1, the signal VC is High level, and the signal PDOut and the first control signal pCLK are Low level. It is assumed that the count value of the counter 24 is N immediately before the time t1. The signal levels of the signal VC and the signal PDOut in a period prior to the time t1 at which the first control signal pCLK becomes High level vary depending on the state of incidence of light until then. FIG. 5 illustrates an output assuming that no light is incident before time t1. When the signal VC is High level corresponding to the voltage SVDD, it means that the recharging of the photodiode PD is completed. A period in which the signal VC is High level and the PMOS transistor MP is OFF (the first control signal pCLK is Low level) is a period in which the photodiode PD is controlled to a standby state in which avalanche multiplication is possible.

At time t1, it is assumed that the first control signal pCLK transitions from Low level to High level. As a result, the PMOS transistor MP is turned on, and a recharging operation of returning the cathode (signal VC) of the photodiode PD to the voltage SVDD is performed.

At a subsequent time t2, it is assumed that photon enters the photodiode PD. As a result, avalanche multiplication occurs in the photodiode PD, and the signal VC transitions from High level to Low level corresponding to the voltage VPDL. Then, the signal PDOut, which is the output of the logic circuit NOT1, transitions from Low level to High level. As a result, the count value of the counter 24 increases by 1 LSB from N, and becomes N+1.

It is assumed that after time t1, photons enter the photodiode PD at time t3 and time t4 before time t5 at which the first control signal pCLK next transits from Low level to High level. At times t3 and t4, avalanche multiplication has already occurred in the photodiode PD, and the photodiode PD is in a state before recharging. Therefore, the signal level of each node does not transit by the photons incident at the time t3 and the time t4, and the photons incident at the time t3 and the time t4 are not counted by the counter 24. Photons that are not counted in this manner are indicated by dashed arrows in the upper part of the waveform of the signal VC.

At a subsequent time t5, it is assumed that the first control signal pCLK transits from Low level to High level. As a result, the PMOS transistor MP is turned on, a recharging operation of returning the cathode (signal VC) of the photodiode PD to the voltage SVDD is performed, and the signal VC transitions from Low level to High level. Then, the signal PDOut, which is the output of the logic circuit NOT1, transitions from High level to Low level.

At a subsequent time t6, it is assumed that the first control signal pCLK transits from Low level to High level. Assuming that no photons enter the photodiode PD during the period from the time t5 to the time t6, the signal levels of the signal VC and the signal PDOut do not change during this period.

Similarly, after time t7, when photon is incident during a period from the transition of the first control signal pCLK from Low level to High level to the next transition of the first control signal pCLK from Low level to High level, the count value of the counter 24 increases by 1 LSB. For example, during a period from time t6 to time t8, the count value of the counter 24 increases by 1 LSB from N+1 to N+2 in accordance with the incidence of photon at time t7. In the period from the time t8 to the time t10, the count value of the counter 24 increases from N+2 to 1 LSB in accordance with the incidence of photon at the time t9, and becomes N+3. On the other hand, when no photons are incident during a period from the transition of the first control signal pCLK from Low level to High level to the next transition of the first control signal pCLK from Low level to High level, the signal levels of the signal VC and the signal PDOut do not change. That is, the photons are not counted.

In other words, the second control circuit 22 of the pixel circuit P operates so as to count the number of periods during which the avalanche multiplication occurs in the photodiode PD among the periods defined by the intervals of the pulses superimposed on the first control signal pCLK.

Next, the operation of the signal generation circuit T will be described below by exemplifying the signal generation circuit Tm0 in the m-th row and the 0-th column arranged in the same row as the pixel circuit Pmn.

The circuit of the signal generation circuit T is basically the same as the circuit of the pixel circuit P except that the connection between the logic circuit NOT1 and the counter 24 is disconnected. That is, the transitions of the signal VC and the signal PDOut in the signal generation circuit T are the same as the transitions of the signal VC and the signal PDOut in the pixel circuit P.

On the other hand, as illustrated in FIG. 3B, the first control signal pCLK is directly input to the counter 24 of the signal generation circuit T. That is, the counter 24 of the signal generation circuit T increases the count value by 1 LSB at each timing when the first control signal pCLK, transits from Low level to High level. Specifically, the count value of the counter 24 of the signal generation circuit T increases by 1 LSB at each of the times t1, t5, t6, t8, and t10 at which the first control signal pCLK transits from Low level to High level.

In other words, unlike the second control circuit 22 of the pixel circuit P, the second control circuit 22 of the signal generation circuit T operates to count the number of periods defined by the interval of pulses superimposed on the first control signal pCLK.

For the purpose of speeding up the semiconductor device 100, it may be required to increase the frequency of the first control signal pCLK or shorten the period of High level. In such a case, depending on the load of the element to be driven, a desired output result corresponding to the first control signal pCLK may not be obtained. In this respect, in the semiconductor device 100 according to the present embodiment, the number of pulses of the first control signal pCLK input during a predetermined period may be counted and output by the signal generation circuit T. Therefore, by changing the waveform of the first control signal pCLK, the range in which a desired output result is obtained may be accurately confirmed, and the waveform of the first control signal pCLK may be adjusted as necessary. Since the signal generation circuit T in the same row as the pixel circuit P operates at the same operation timing, the state of the first control signal pCLK input to the pixel circuit P may be accurately checked. Further, by checking the outputs of the row (the signal generation circuits T00 to T0n in FIG. 1 and FIG. 2) in which only the signal generation circuits 1 are arranged, it is possible to accurately check the change state of the signal depending on the column position.

As described above, according to the semiconductor device of the present embodiment, the state of the first control signal pCLK may be accurately checked, and the operation of the semiconductor device may be stabilized.

Second Embodiment

Figure 7:
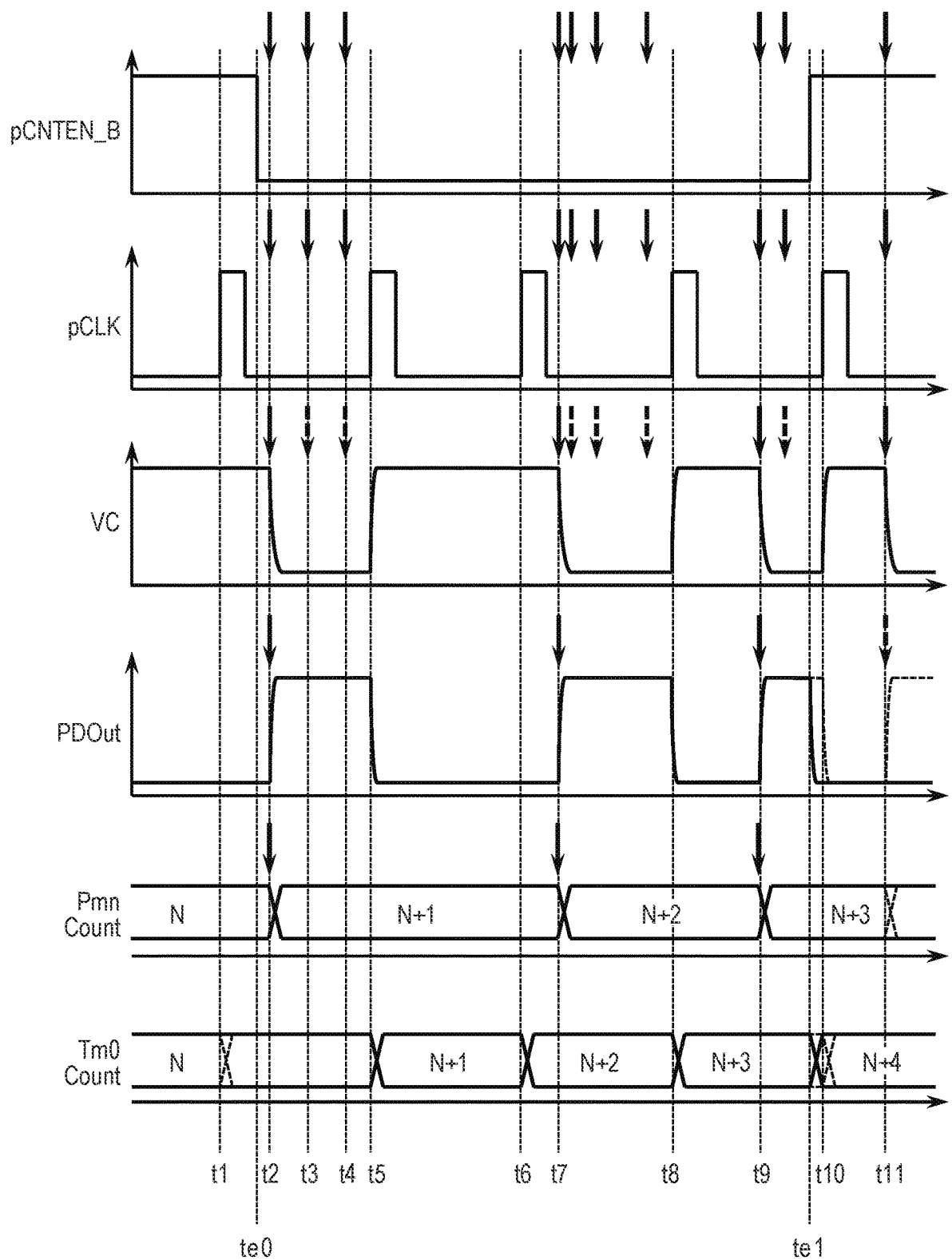
FIG. 7 is a timing chart illustrating the operation of the semiconductor device according to the second embodiment of the present invention.

A semiconductor device according to a second embodiment of the present invention will be described with reference to FIG. 6A to FIG. 7. FIG. 6A is a diagram illustrating a configuration example of a pixel circuit in the semiconductor device according to the present embodiment. FIG. 6B is a diagram illustrating a configuration example of a signal generation circuit in the semiconductor device according to the present embodiment. FIG. 7 is a timing chart illustrating the operation of the semiconductor device according to the present embodiment. Components similar to those of the semiconductor device according to the first embodiment are denoted by the same reference numerals, and description thereof will be omitted or simplified.

The semiconductor device according to the present embodiment is different from the semiconductor device according to the first embodiment in the circuit configuration of the pixel circuit P and the signal generation circuit T constituting the pixel region 10. The pixel circuit P and the signal generation circuit T in the semiconductor device according to the present embodiment will be described below mainly with respect to differences from the first embodiment.

FIG. 6A is a diagram illustrating a configuration example of the pixel circuit P in the semiconductor device according to the present embodiment. As illustrated in FIG. 6A, the pixel circuit P includes a photodiode PD, logic circuits NOT2 and OR1, a first control circuit 20, and a second control circuit 22. The first control circuit 20 includes a PMOS transistor MP. The second control circuit 22 includes a logic circuit NOR1, a counter 24, and an output circuit 26. The logic circuit NOT2, the logic circuit OR1, and the logic circuit NOR1 may be configured by a NOT circuit (inverter circuit), a 2-input OR circuit, and a 2-input NOR circuit, respectively. The logic circuits NOT2 and OR1 do not necessarily have to be included in each pixel circuit P, and may be, for example, a part of the vertical selection circuit 30 or the control unit 70. In this case, the output signal of the logic circuit NOT2 is supplied to the first control circuit 20 via the control line 14, and the output signal of the logic circuit OR1 is supplied to the second control circuit 22 via the control line 14.

A cathode of the photodiode PD is connected to one of a source and a drain of the PMOS transistor MP and a first input node of the logic circuit NOR1. A gate of the PMOS transistor MP is connected to an output node of the logic circuit NOT2. A second input node of the logic circuit NOR1 is connected to an output node of the logic circuit OR1. An output node of the logic circuit NOR1 is connected to the input node of the counter 24. A first control signal pCLK is input to a first input node of the logic circuit OR1 via a control line 14. A second control signal pCNTEN_B generated by a pulse generation circuit (not illustrated) provided outside the pixel circuit P is input to a second input node of the logic circuit OR1 via a control line 14. The output signal of the logic circuit OR1 is a signal CNTEN_B input to the second input node of the logic circuit NOR1. In the present embodiment, the output signal of the logic circuit NOR1 is the signal PDOut. The other points are the same as those of the pixel circuit P of the first embodiment.

Thus, in the present embodiment, the second control signal pCNTEN_B is added, and the signal CNTEN_B, which is a result of the OR logic between the first control signal pCLK and the second control signal pCNTEN_B, is input to the second control circuit 22. The second control signal pCNTEN_B is a signal for defining the exposure period of the photodiode PD. Further, the logic circuit of the second control circuit 22 is changed from the inverter circuit (logic circuit NOT1) to the NOR circuit (logic circuit NOR1), and an output signal of the logic circuit NOR1 to which the signal VC and the signal CNTEN_B are input is set as a signal PDOut.

By configuring the pixel circuit P in this manner, the operation of the counter 24 may be controlled asynchronously with the first control signal pCLK. For example, in a high luminance environment in which the number of incident photon is large, the exposure period of the photodiode PD may be controlled by the second control signal pCNTEN_B while the photodiode PD is appropriately recharged by the first control signal pCLK.

FIG. 6B is a diagram illustrating a configuration example of the signal generation circuit T in the semiconductor device according to the present embodiment. Similar to the pixel circuit P, the signal generation circuit T includes a photodiode PD, logic circuits NOT2 and OR1, a first control circuit 20, and a second control circuit 22, as illustrated in FIG. 6B. The first control circuit 20 includes a PMOS transistor MP. The second control circuit 22 includes a logic circuit NOR1, a counter 24, and an output circuit 26. The logic circuit NOT2, the logic circuit OR1, and the logic circuit NOR1 may be configured by a NOT circuit (inverter circuit), a 2-input OR circuit, and a 2-input NOR circuit, respectively. The logic circuits NOT2 and OR1 do not necessarily have to be included in each signal generation circuit T, and may be, for example, a part of the vertical selection circuit 30 or the control unit 70. In this case, the output signal of the logic circuit NOT2 is supplied to the first control circuit 20 via the control line 14 or the like, and the output signal of the logic circuit OR1 is supplied to the second control circuit 22 via the control line 14 or the like. The difference between the signal generation circuit T and the pixel circuit P is that the input node of the counter 24 is isolated from the output node of the logic circuit NOR1, and the signal CNTEN_B is input to the input node of the counter 24 instead. The second input node of the logic circuit NOR1 is supplied with the reference voltage GND instead of the signal CNTEN_B.

By configuring the signal generation circuit T in this manner, the signal generation circuit T may measure the number of times that the first control signal pCLK transits from Low level to High level during the period in which the second control signal pCNTEN_B is Low level by the counter 24. A signal POUT, which is a measurement result of the counter 24, may be output from the output line 16.

Next, the operation of the semiconductor device 100 according to the present embodiment will be described with reference to FIG. 7. FIG. 7 is a timing chart illustrating the operation of the pixel circuit P and the signal generation circuit T illustrated in FIG. 6A and FIG. 6B. In FIG. 7, "Pmn Count" denotes a count value of the counter 24 of the pixel circuit Pmn, and "Tm0 Count" denotes a count value of the counter 24 of the signal generation circuit Tm0. The other signals illustrated in FIG. 7 correspond to the signals illustrated in the respective portions of FIG. 6A and FIG. 6B. Further, in FIG. 7, the timing at which photons enter the photodiode PD is indicated by arrows in the upper part of the signal waveform. Here, it is assumed that photons are incident at the same timing as in the timing chart of FIG. 5.

First, the operation of the pixel circuit P will be described below by taking the pixel circuit Pmn in the m-th row and the n-th column as an example.

Immediately before time t1, the second control signal pCNTEN_B and the signal VC are High level, and the first control signal pCLK and the signal PDOut are Low level. It is assumed that the count value of the counter 24 is N immediately before the time t1.

At time t1, it is assumed that the first control signal pCLK transitions from Low level to High level. As a result, the PMOS transistor MP is turned on, and a recharging operation of returning the cathode (signal VC) of the photodiode PD to the voltage SVDD is performed.

At time te0 after the first control signal pCLK returns from High level to Low level, the second control signal pCNTEN_B transitions from High level to Low level. Thereby, the signal CNTEN_B transitions from High level to Low level. At this time, since the logic circuit NOR1 is NOR logic, the signal PDOut becomes an inverted signal of the signal VC. That is, the counter 24 is to be a detectable state of a change in the output of the photodiode PD.

The subsequent operation from time t2 to time t9 is similar to that of FIG. 5.

At time te1, it is assumed that the second control signal pCNTEN_B transitions from Low level to High level. Thereby, the signal CNTEN_B transitions from Low level to High level. At this time, since the logic circuit NOR1 is NOR logic, the signal PDOut becomes Low level regardless of the state of the signal VC. That is, the count value of the counter 24 does not increase any more.

For example, even when the photon incident on the subsequent time t11 causes avalanche multiplication in the photodiode PD and the signal VC transits from High level to Low level, the signal PDOut remains at Low level and the count value of the counter 24 does not change. That is, the operation of the counter 24 may be controlled asynchronously with respect to the first control signal pCLK by the second control signal pCNTEN_B. Thus, the count period in the second control circuit 22 of the pixel circuit P is defined by the first control signal pCLK and the second control signal pCNTEN_B.

Next, the operation of the signal generation circuit T will be described below by exemplifying the signal generation circuit Tm0 in the m-th row and the 0-th column arranged in the same row as the pixel circuit Pmn.

The circuit of the signal generation circuit T is basically the same as the circuit of the pixel circuit P except that the connection between the logic circuit NOR1 and the counter 24 is disconnected. That is, the transitions of the signal VC and the signal PDOut in the signal generation circuit T are the same as the transitions of the signal VC and the signal PDOut in the pixel circuit P.

On the other hand, as illustrated in FIG. 6B, a signal CNTEN_B corresponding to the logical disjunction of the first control signal pCLK and the second control signal pCNTEN_B is input to the counter 24 of the signal generation circuit T. That is, the counter 24 of the signal generation circuit T increases the count value by 1 LSB at a timing when at least one of the first control signal pCLK and the second control signal pCNTEN_B becomes High level. Specifically, the count value of the counter 24 of the signal generation circuit T increases by 1 LSB at each of the times t5, t6, t8, and te1. The count period in the second control circuit 22 of the signal generation circuit T is defined by the first control signal pCLK and the second control signal pCNTEN_B, similarly to the count period in the second control circuit 22 of the pixel circuit P.

When the number of the pixel circuits P constituting the pixel region 10 increases, the phase relationship between the first control signal pCLK and the second control signal pCNTEN_B may be reversed due to the influence of a load or an interconnection, and a desired output result may not be obtained. In this respect, in the semiconductor device 100 according to the present embodiment, the number of pulses of the first control signal pCLK input during the period in which the second control signal pCNTEN_B is at Low level may be counted and output by the signal generation circuit T. Therefore, by changing the timing at which the second control signal pCNTEN_B transits, the range in which a desired output result is obtained may be accurately confirmed, and the waveforms of the first control signal pCLK and the second control signal pCNTEN_B may be adjusted as necessary. In addition, since the pixel circuits P and the signal generation circuits T in the same row operate at the same operation timing, the phase relationship between the first control signal pCLK and the second control signal pCNTEN_B input to the pixel circuits P, and the states of the first control signal pCLK and the second control signal pCNTEN_B may be accurately confirmed. Further, by checking the outputs of the row (the signal generation circuits T00 to T0n in FIG. 1 and FIG. 2) in which only the signal generation circuits T are arranged, it is possible to accurately check the change state of the signal depending on the column position.

As described above, according to the semiconductor device of the present embodiment the phase relationship between the first control signal pCLK and the second control signal pCNTEN_B and the state of the first control signal pCLK, may be accurately confirmed, and the operation of the semiconductor device may be stabilized.

Third Embodiment

Figure 8A:
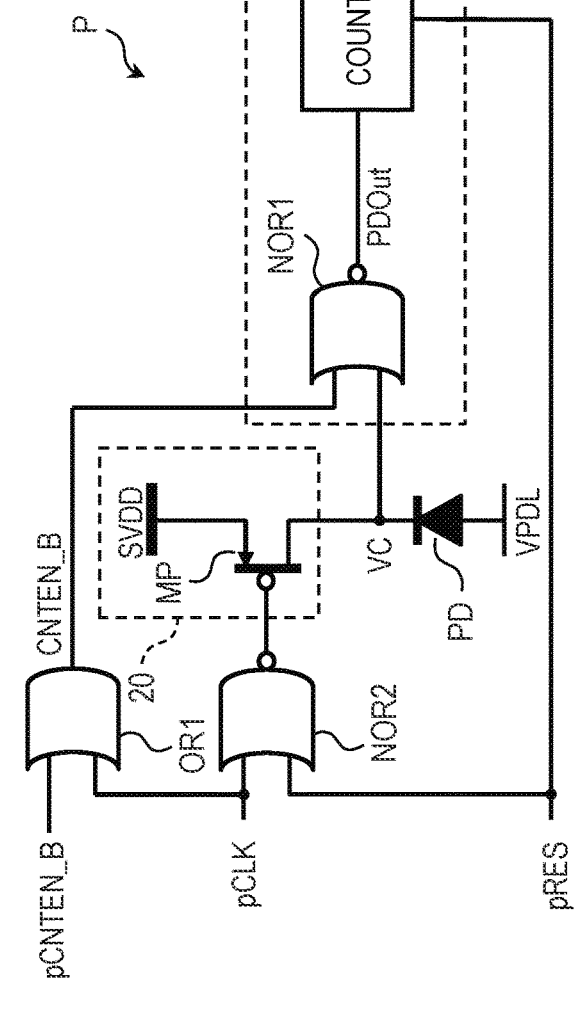
FIG. 8A is a diagram illustrating a configuration example of a pixel circuit in a semiconductor device according to a third embodiment of the present invention.
Figure 8B:
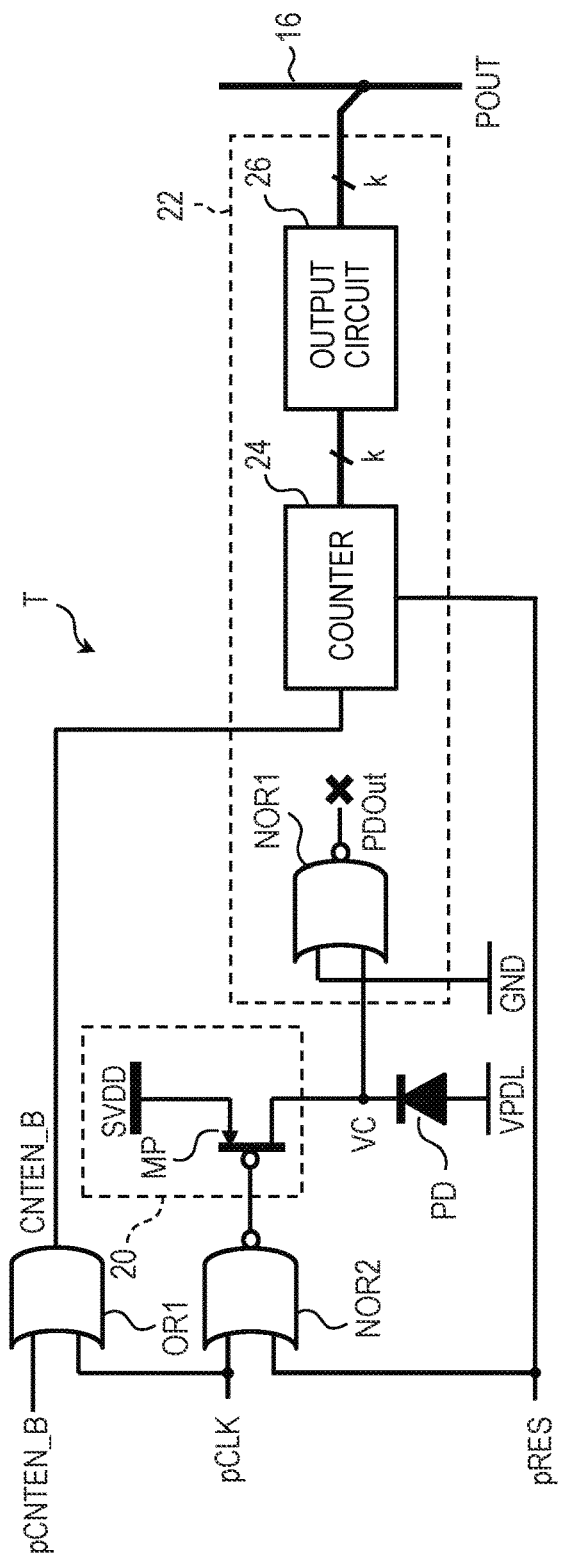
FIG. 8B is a diagram illustrating a configuration example of a signal generation circuit in the semiconductor device according to the third embodiment of the present invention.
Figure 9:
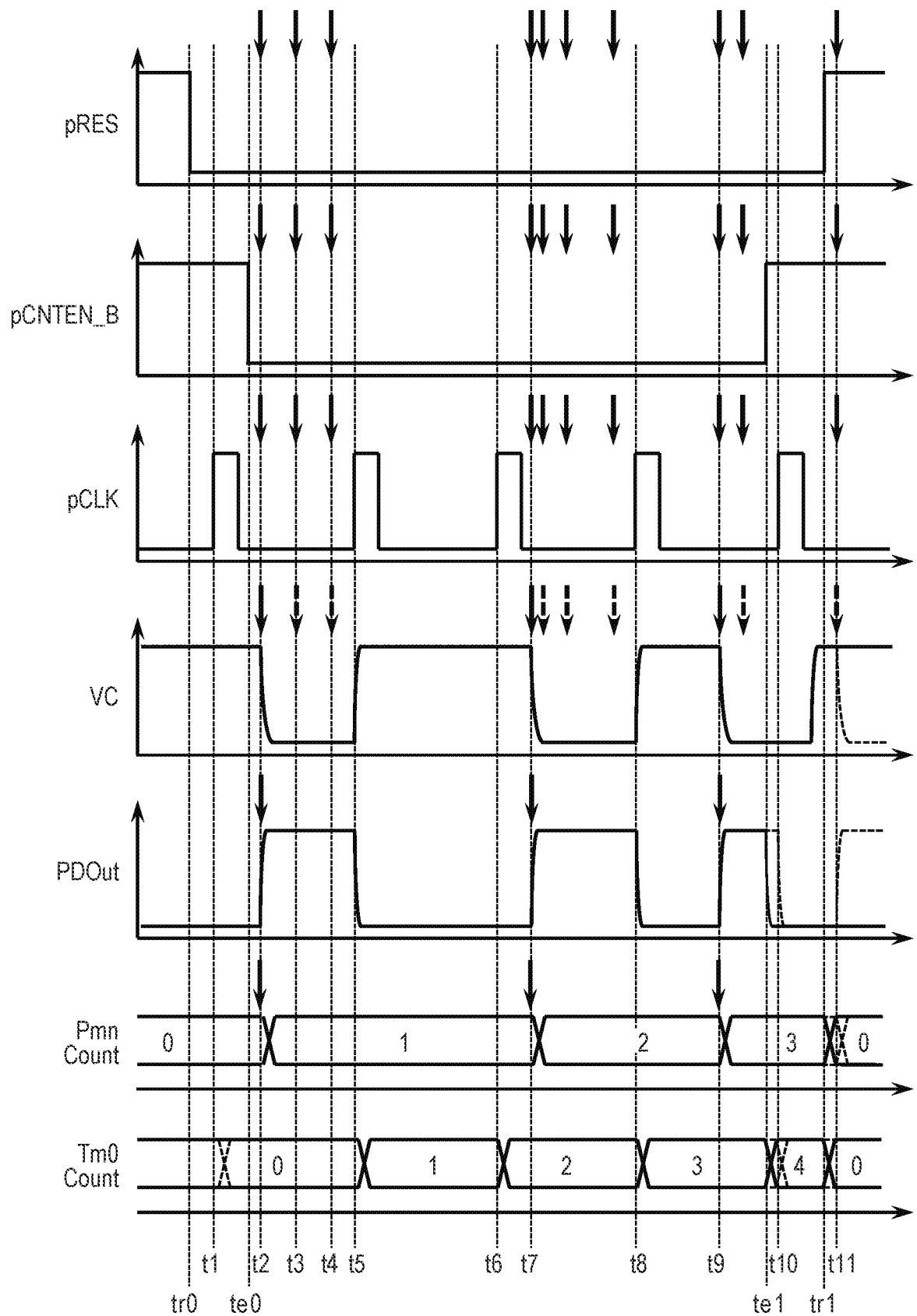
FIG. 9 is a timing chart illustrating the operation of the semiconductor device according to the third embodiment of the present invention.

A semiconductor device according to a third embodiment of the present invention will be described with reference to FIG. 8A to FIG. 9. FIG. 8A is a diagram illustrating a configuration example of a pixel circuit in the semiconductor device according to the present embodiment. FIG. 8B is a diagram illustrating a configuration example of a signal generation circuit in the semiconductor device according to the present embodiment. FIG. 9 is a timing chart illustrating the operation of the semiconductor device according to the present embodiment. Components similar to those of the semiconductor devices according to the first and second embodiments are denoted by the same reference numerals, and description thereof will be omitted or simplified.

The semiconductor device according to the present embodiment is different from the semiconductor devices according to the first and second embodiments in the circuit configuration of the pixel circuit P and the signal generation circuit T constituting the pixel region 10. The pixel circuit P and the signal generation circuit T in the semiconductor device according to the present embodiment will be described below mainly with respect to differences from the first and second embodiments.

FIG. 8A is a diagram illustrating a configuration example of the pixel circuit P in the semiconductor device according to the present embodiment. As illustrated in FIG. 8A, the pixel circuit P includes a photodiode PD, logic circuits NOR2 and OR1, a first control circuit 20, and a second control circuit 22. The first control circuit 20 includes a PMOS transistor MP. The second control circuit 22 includes a logic circuit NOR1, a counter 24, and an output circuit 26. The logic circuit NOR1 and the logic circuit NOR2 may be configured by a 2-input NOR circuit, and the logic circuit OR1 may be configured by a 2-input OR circuit. The logic circuits NOR2 and OR1 do not necessarily have to be included in each pixel circuit P, and may be, for example, a part of the vertical selection circuit 30 or the control unit 70. In this case, the output signal of the logic circuit NOR2 is supplied to the first control circuit 20 via the control line 14, and the output signal of the logic circuit OR1 is supplied to the second control circuit 22 via the control line 14.

The gate of the PMOS transistor MP is connected to the output node of the logic circuit NOR2. A first control signal pCLK is input to a first input node of the logic circuit NOR2. A reset signal pRES generated by a pulse generation circuit (not illustrated) provided outside the pixel circuit P is supplied to a second input node of the logic circuit NOR2 via a control line 14. The reset signal pRES is a control signal used for resetting the count value of the counter 24. The other points are the same as those of the pixel circuit P of the second embodiment.

Thus, in the present embodiment, the reset signal pRES is added, and the count value of the counter 24 may be reset. The signal input to the gate of the PMOS transistor MP is changed from the inverted signal of the first control signal pCLK to an output signal of NOR logic of the first control signal pCLK and the reset signal pRES.

By configuring the pixel circuit P in this manner, the reset of the counter 24 and the recharging operation of the photodiode PD may be controlled asynchronously with the first control signal pCLK and the second control signal pCNTEN_B. Thus, for example, in addition to arbitrarily controlling the accumulation time, it is possible to control the photodiode PD so that the avalanche multiplication is not performed. In other words, power consumption due to the avalanche multiplication and the recharging operation may be suppressed. Further, by fixing the signal PDOut output from the logic circuit NOR1 to Low level, erroneous detection after the reset release of the counter 24, which may occur when the signal PDOut is indeterminate, may be avoided.

FIG. 8B is a diagram illustrating a configuration example of the signal generation circuit T in the semiconductor device according to the present embodiment. As illustrated in FIG. 8B, the signal generation circuit T includes a photodiode PD, logic circuits NOR2 and OR1, a first control circuit 20, and a second control circuit 22. The first control circuit 20 includes a PMOS transistor MP. The second control circuit 22 includes a logic circuit NOR1, a counter 24, and an output circuit 26. The logic circuit NOR1 and the logic circuit NOR2 may be configured by a 2-input NOR circuit, and the logic circuit OR1 may be configured by a 2-input OR circuit. The logic circuits NOR2 and OR1 do not necessarily have to be included in each pixel circuit P, and may be, for example, a part of the vertical selection circuit 30 or the control unit 70. In this case, the output signal of the logic circuit NOR2 is supplied to the first control circuit 20 via the control line 14, and the output signal of the logic circuit OR1 is supplied to the second control circuit 22 via the control line 14. The difference between the signal generation circuit T and the pixel circuit P is that the input node of the counter 24 is isolated from the output node of the logic circuit NOR1, and the signal CNTEN_B is input to the input node of the counter 24 instead.

By configuring the signal generation circuit T in this manner, the signal generation circuit T may measure the number of times the first control signal pCLK transits from Low level to High level by the counter 24 during the period in which the reset signal pRES and the second control signal pCNTEN_B are Low level. A signal POUT, which is a measurement result of the counter 24, may be output to the output line 16.

Next, the operation of the semiconductor device 100 according to the present embodiment will be described with reference to FIG. 9. FIG. 9 is a timing chart illustrating the operation of the pixel circuit P and the signal generation circuit T illustrated in FIG. 8A and FIG. 8B. In FIG. 9, "Pmn Count" denotes a count value of the counter 24 of the pixel circuit Pmn, and "Tm0 Count" denotes a count value of the counter 24 of the signal generation circuit Tm0. The other signals illustrated in FIG. 9 correspond to the signals illustrated in the respective portions of FIG. 8A and FIG. 8B. FIG. 9 further illustrates the timing at which photons enter the photodiode PD by arrows in the upper part of the signal waveform. Here, it is assumed that photons are incident at the same timing as in the timing diagrams of FIG. 5 and FIG. 7.

First, the operation of the pixel circuit P will be described below by taking the pixel circuit Pmn in the m-th row and the n-th column as an example.

In a period before time tr0, the reset signal pRES, the second control signal pCNTEN_B, and the signal VC are at High level, and the first control signal pCLK and the signal PDOut are at Low level. Here, the time tr0 is a time before the time t1 in FIG. 5 and FIG. 7. During this period, since the reset signal pRES is at High level, the counter 24 is in the reset state, and the count value of the counter 24 is 0. Since the PMOS transistor MP of the first control circuit 20 is maintained in the ON state, the photodiode PD is maintained in the recharging state.

At time tr0, it is assumed that the reset signal pRES transitions from High level to Low level. As a result, the counter 24 is to be a detectable state of a change in the output of the photodiode PD. Further, the PMOS transistor MP of the first control circuit 20 is turned off, and the photodiode PD is controlled to a standby state in which avalanche multiplication may be performed.

The subsequent operation from time t1 to time t10 is similar to that of FIG. 7.

At a subsequent time tr1, it is assumed that the reset signal pRES transitions from Low level to High level. Thereby, the counter 24 is reset, and the count value of the counter 24 returns to 0. Further, the PMOS transistor MP of the first control circuit 20 is turned on, and the photodiode PD is in a recharging state. That is, the operation of the counter 24 and the photodiode PD may be controlled asynchronously with respect to the first control signal pCLK and the second control signal pCNTEN_B by the reset signal pRES.

Next, the operation of the signal generation circuit T will be described below by exemplifying the signal generation circuit Tm0 in the m-th row and the 0-th column arranged in the same row as the pixel circuit Pmn.

The circuit of the signal generation circuit T is basically the same as the circuit of the pixel circuit P except that the connection between the logic circuit NOR1 and the counter 24 is disconnected. That is, the transition of the signal VC and the signal PDOut in the signal generation circuit T is the same as the transition of the signal VC and the signal PDOut in the pixel circuit P.

On the other hand, since the reset signal pRES of High level is input to the counter 24 of the signal generation circuit T during the period until the time tr0, the count value of the counter 24 is 0. After the time tr0, similarly to FIG. 7, at each of the times t5, t6, t8, and te1, the signal CNTEN_B transitions from Low level to High level, and the count value of the counter 24 increases by 1 LSB. At the subsequent time tr1, similarly to the counter 24 of the pixel circuit P, the counter 24 is reset, and the count value of the counter 24 returns to 0.

When the number of the pixel circuits P constituting the pixel region 10 increases, the phase relationship between the first control signal pCLK, and the second control signal pCNTEN_B or the reset signal pRES may be reversed due to the influence of a load or an interconnection, and a desired output result may not be obtained. In this respect, in the semiconductor device 100 according to the present embodiment, the number of pulses of the first control signal pCLK input during the period in which the reset signal pRES and the second control signal pCNTEN_B are at Low level may be counted and output by the signal generation circuit T. Therefore, by changing the timing at which the second control signal pCNTEN_B or the reset signal pRES transits, it is possible to accurately confirm the range in which a desired output result is obtained. The waveforms of the first control signal pCLK, the second control signal pCNTEN_B, and the reset signal pRES may be adjusted as necessary. Further, since the pixel circuit P and the signal generation circuit in the same row operate at the same operation timing, the phase relationship and states of the first control signal pCLK, the second control signal pCNTEN_B, and the reset signal pRES input to the pixel circuit P may be accurately confirmed. Further, by checking the outputs of the row (the signal generation circuits T00 to T0n in FIG. 1 and FIG. 2) in which only the signal generation circuits T are arranged, it is possible to accurately check the change state of the signal depending on the column position.

As described above, according to the semiconductor device of the present embodiment, the phase relationship between the first control signal pCLK, and the second control signal pCNTEN_B and the reset signal pRES, and the state of the first control signal pCLK may be accurately confirmed, and the operation of the semiconductor device may be stabilized.

Fourth Embodiment

A semiconductor device according to a fourth embodiment of the present invention will be described with reference to FIG. 10A and FIG. 10B. FIG. 10A is a diagram illustrating a configuration example of a pixel circuit in the semiconductor device according to the present embodiment. FIG. 10B is a diagram illustrating a configuration example of a signal generation circuit in the semiconductor device according to the present embodiment. Components similar to those of the semiconductor devices according to the first to third embodiments are denoted by the same reference numerals, and description thereof will be omitted or simplified.

The semiconductor device according to the present embodiment is different from the semiconductor device according to the third embodiment in the circuit configuration of the signal generation circuit T constituting the pixel region 10. The signal generation circuit T in the semiconductor device according to the present embodiment will be described below mainly with respect to points different from the third embodiment.

FIG. 10A is a diagram illustrating the configuration of the pixel circuit P the semiconductor device according to the present embodiment, and FIG. 10B is a diagram illustrating the configuration of the signal generation circuit T in the semiconductor device according to the present embodiment. As illustrated in FIG. 10A and FIG. 10B, the configuration of the pixel circuit P of the semiconductor device according to the present embodiment is the same as that of the third embodiment, but the configuration of the signal generation circuit T is different from that of the third embodiment.

As illustrated in FIG. 10B, the signal generation circuit T includes a photodiode PD, logic circuits NOR2, OR1, NOR1, a first control circuit 20, a selection circuit SEL, and an output amplifier 28. That is, the signal generation circuit T according to the present embodiment is different from the signal generation circuit T of the third embodiment in that the counter 24 and the output circuit 26 are changed to the selection circuit SEL and the output amplifier 28. The selection circuit SEL includes a plurality of input nodes, one output node, and a control node. A first control signal pCLK, a second control signal pCNTEN_B, a reset signal pRES, and a signal PDOut which is an output of the logic circuit NOR1 are supplied to the plurality of input nodes of the selection circuit SEL. A test output selection signal TESTSEL (third control signal) is supplied to the control node of the selection circuit SEL. The output node of the selection circuit SEL is connected to an input node of the output amplifier 28. An output node of the output amplifier 28 is connected to the output line 16.

The selection circuit SEL has a function of selecting either the first control signal pCLK or a signal different from the first control signal pCLK among the signals input to the selection circuit SEL according to the set value of the test output selection signal TESTSEL and outputting the selected signal to the output amplifier 28. The signals input to the selection circuit SEL are not necessarily limited to the first control signal pCLK, the second control signal pCNTEN_B, the reset signal pRES, and the signal PDOut, and may be other signals. For example, a signal CNTEN_B, a signal VC, a signal of another node, and the like may be selected as a signal input to the selection circuit SEL. The number of bits of the signal TESTSEL may be appropriately changed according to the number of input signals.

The output amplifier 28 appropriately amplifies the analog signal output from the selection circuit SEL and outputs the amplified analog signal to the output line 16 as a signal POUT. Although FIG. 10B assumes a single-line output as the output of the output amplifier 28, the output of the output amplifier 28 may be a differential output.

By configuring the signal generation circuit T in this manner, the waveform of each signal may be directly confirmed. Thereby, it is possible to accurately confirm whether or not a desired signal is input to each pixel circuit P, and it is possible to adjust as necessary. In addition, since the pixel circuits P and the signal generation circuit T in the same row operate at the same operation timing, the phase relationship and states of the first control signal pCLK, the second control signal pCNTEN_B, and the reset signal pRES input to the pixel circuits P may be accurately confirmed. Further, by checking the outputs of the row (the signal generation circuits T00 to T0n in FIG. 1 and FIG. 2) in which only the signal generation circuits T are arranged, it is possible to accurately check the change state of the signal depending on the column position.

As described above, according to the semiconductor device of the present embodiment, the states of the first control signal pCLK, the second control signal pCNTEN_B, the reset signal pRES, and the like may be accurately confirmed, and the operation of the semiconductor device may be stabilized.

Fifth Embodiment

Figure 11:
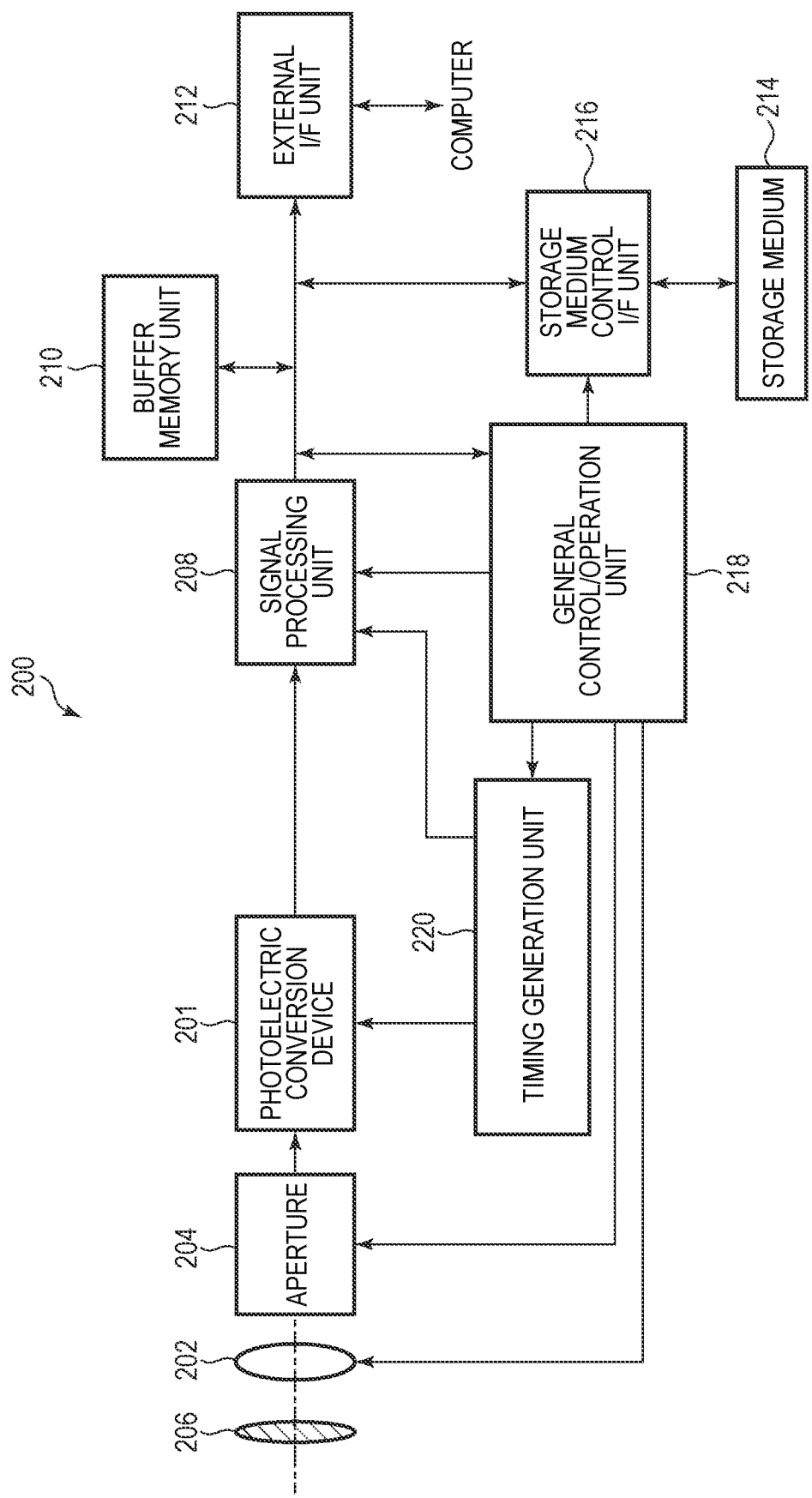
FIG. 11 is a block diagram illustrating a schematic configuration of a photodetection system according to a fifth embodiment of the present invention.

A photodetection system according to a fifth embodiment of the present invention will be described with reference to FIG. 11. FIG. 11 is a block diagram illustrating a schematic configuration of the photodetection system according to the present embodiment. In the present embodiment, a photodetection sensor to which the semiconductor device 100 described in any of the first to fourth embodiments is applied will be described.

The semiconductor device 100 described in the first to fourth embodiments may be applied to various photodetection systems. Examples of applicable photodetection systems include digital still cameras, digital camcorders, surveillance cameras, copying machines, facsimiles, mobile phones, on-vehicle cameras, observation satellites, and the like. A camera module including an optical system such as a lens and an imaging device is also included in the photodetection system. FIG. 11 is a block diagram of a digital still camera as an example of these.

The photodetection system 200 illustrated in FIG. 11 includes a photoelectric conversion device 201, a lens 202 for forming an optical image of an object on the photoelectric conversion device 201, an aperture 204 for varying the amount of light passing through the lens 202, and a barrier 206 for protecting the lens 202. The lens 202 and the aperture 204 are optical systems for focusing light on the photoelectric conversion device 201. The photoelectric conversion device 201 is the semiconductor device 100 described in any of the first to fourth embodiments, and converts an optical image formed by the lens 202 into image data.

The photodetection system 200 also includes a signal processing unit 208 that processes an output signal output from the photoelectric conversion device 201. The signal processing unit 208 generates image data from the digital signal output from the photoelectric conversion device 201. The signal processing unit 208 performs various corrections and compressions as necessary to output image data. The photoelectric conversion device 201 may include an AD conversion unit that generates a digital signal to be processed by the signal processing unit 208. The AD conversion unit, which is a part of the signal processing unit 208, may be formed on a semiconductor substrate provided with the photoelectric conversion device 201, or may be formed on a semiconductor substrate different from the photoelectric conversion device 201. The photoelectric conversion device 201 and the signal processing unit 208 may be formed on the same semiconductor substrate.

The photodetection system 200 further includes a buffer memory unit 210 for temporarily storing image data, and an external interface unit (external I/F unit) 212 for communicating with an external computer or the like. Further, the photodetection system 200 includes a storage medium 214 such as a semiconductor memory for storing or reading out captured image data, and a storage medium control interface unit (storage medium control I/F unit) 216 for storing or reading out image data on or from the storage medium 214. The storage medium 214 may be built in the photodetection system 200, or may be detachable. Further, communication between the storage medium control I/F unit 216 and the storage medium 214 and communication from the external I/F unit 212 may be performed wirelessly.

Further, the photodetection system 200 includes a general control/operation unit 218 that controls various calculations and the entire digital still camera, and a timing generation unit 220 that outputs various timing signals to the photoelectric conversion device 201 and the signal processing unit 208. Here, the timing signal or the like may be input from the outside, and the photodetection system 200 may include at least the photoelectric conversion device 201 and a signal processing unit 208 that processes the output signal output from the photoelectric conversion device 201. The timing generation unit 220 may be mounted on the photoelectric conversion device 201. Further, the general control/operation unit 218 and the timing generation unit 220 may be configured to implement some or all of the control functions of the photoelectric conversion device 201.

The photoelectric conversion device 201 outputs an imaging signal to the signal processing unit 208. The signal processing unit 208 performs predetermined signal processing on the imaging signal output from the photoelectric conversion device 201, and outputs image data. The signal processing unit 208 generates an image using the imaging signal. The signal processing unit 208 may be configured to perform a distance measurement operation on a signal output from the photoelectric conversion device 201.

As described above, according to the present embodiment, by configuring the photodetection system using the semiconductor device 100 according to the first to fourth embodiments, it is possible to realize the photodetection system capable of obtaining a higher quality image.

Sixth Embodiment

Figure 12:
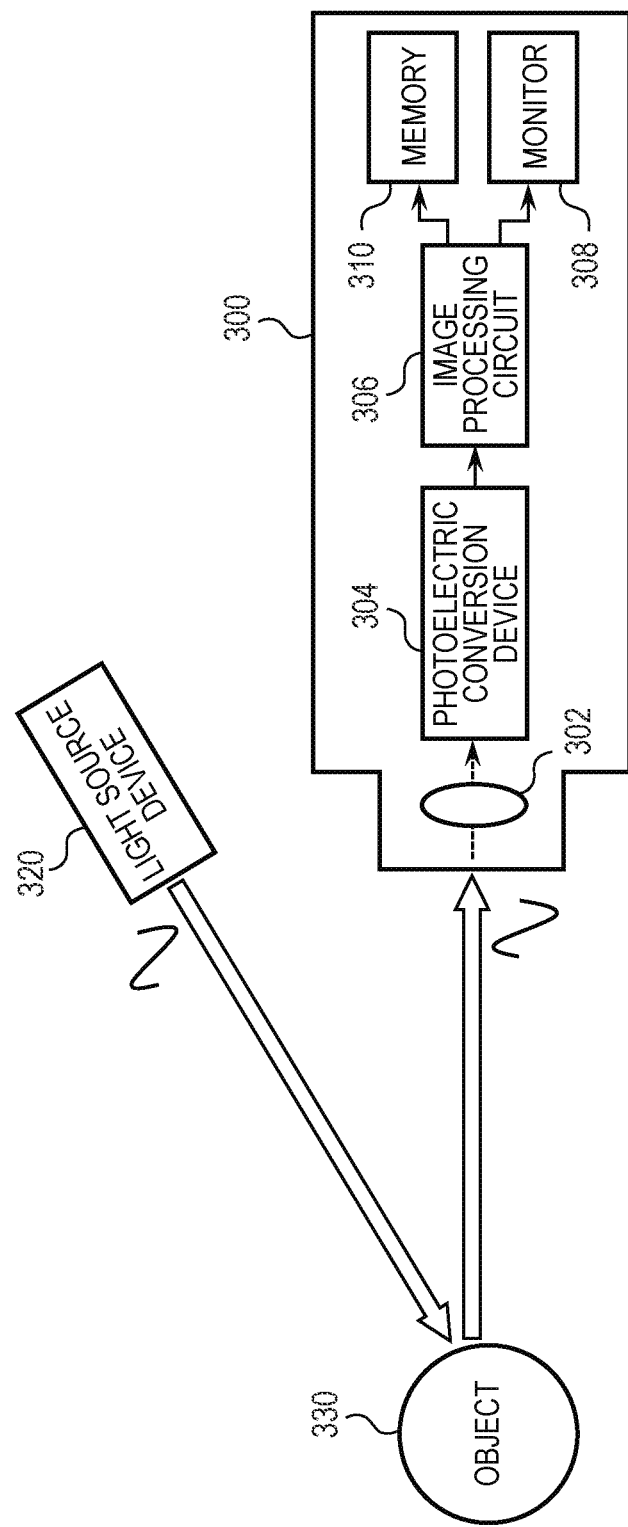
FIG. 12 is a block diagram illustrating a schematic configuration of a range image sensor according to a sixth embodiment of the present invention.

A range image sensor according to a sixth embodiment of the present invention will be described with reference to FIG. 12. FIG. 12 is a block diagram illustrating a schematic configuration of the range image sensor according to the present embodiment. In the present embodiment, a range image sensor will be described as an example of a photodetection system to which the semiconductor device 100 described in any one of the first to fourth embodiments is applied.

As illustrated in FIG. 12, the range image sensor 300 according to the present embodiment may include an optical system 302, a photoelectric conversion device 304, an image processing circuit 306, a monitor 308, and a memory 310. The range image sensor 300 receives light (modulated light or pulse light) emitted from the light source device 320 toward the object 330 and reflected by the surface of the object 330, and acquires a distance image corresponding to the distance to the object 330.

The optical system 302 includes one or a plurality of lenses, and has a role of forming an image of image light (incident light) from the object 330 on a light receiving surface (sensor unit) of the photoelectric conversion device 304.

The photoelectric conversion device 304 is the semiconductor device 100 described in any of the first to fourth embodiments, and has a function of generating a distance signal indicating the distance to the object 330 based on the image light from the object 330 and supplying the generated distance signal to the image processing circuit 306.

The image processing circuit 306 has a function of performing image processing for constructing a distance image based on the distance signal supplied from the photoelectric conversion device 304.

The monitor 308 has a function of displaying a distance image (image data) obtained by image processing in the image processing circuit 306. The memory 310 has a function of storing (recording) a distance image (image data) obtained by image processing in the image processing circuit 306.

As described above, according to the present embodiment, by configuring the range image sensor using the semiconductor device according to any one of the first to fourth embodiments, it is possible to realize a range image sensor capable of acquiring a distance image including more accurate distance information in conjunction with improvement in characteristics of the pixel circuit P.

Seventh Embodiment

Figure 13:
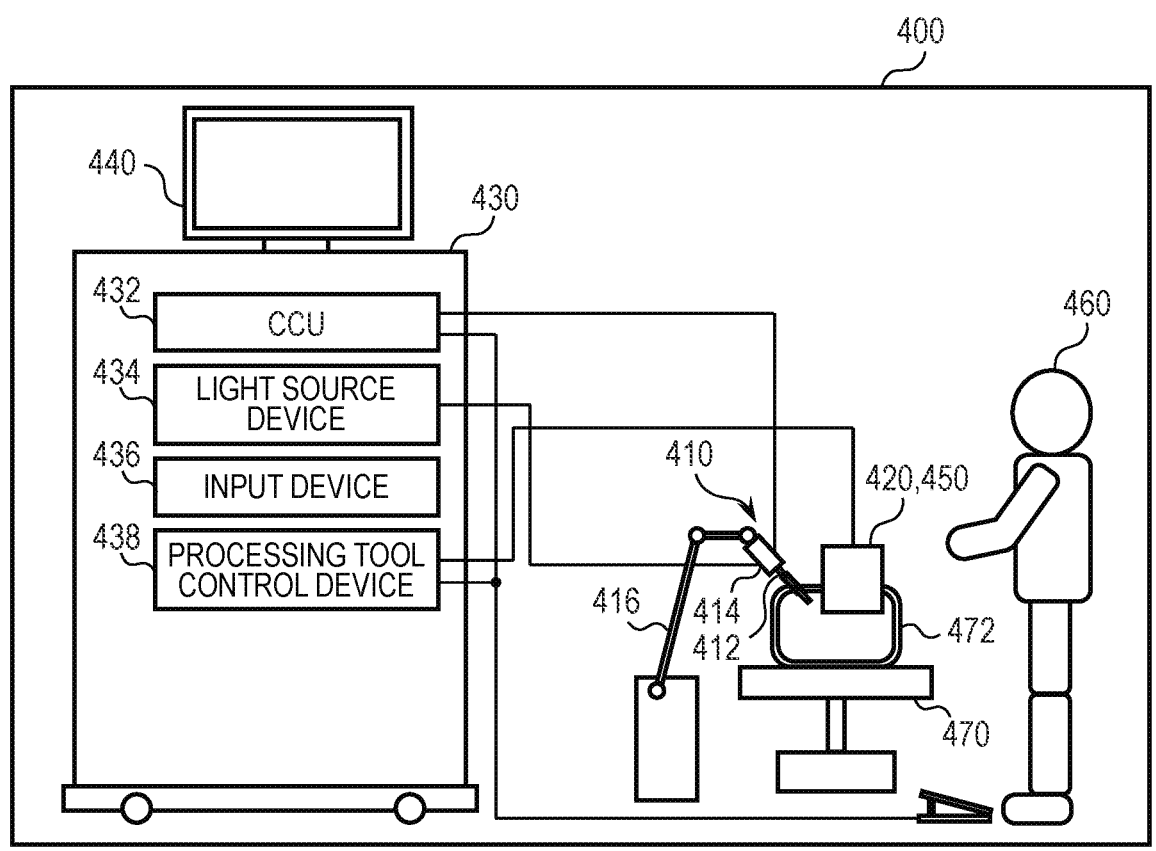
FIG. 13 is a schematic diagram illustrating a configuration example of an endoscopic surgical system according to a seventh embodiment of the present invention.

An endoscopic surgical system according to a seventh embodiment of the present invention will be described with reference to FIG. 13. FIG. 13 is a schematic diagram illustrating a configuration example of the endoscopic surgical system according to the present embodiment. In the present embodiment, an endoscopic surgical system will be described as an example of a photodetection system to which the semiconductor device 100 according to any one of the first to fourth embodiments is applied.

FIG. 13 illustrates a state in which an operator (surgeon) 460 performs an operation on a patient 472 on a patient bed 470 using an endoscopic surgical system 400.

As illustrated in FIG. 13, the endoscopic surgical system 400 according to the present embodiment may include an endoscope 410, a surgical tool 420, and a cart 430 on which various devices for endoscopic surgery are mounted. The cart 430 may include a CCU (Camera Control Unit) 432, a light source device 434, an input device 436, a processing tool control device 438, a display device 440, and the like.

Figure 16:
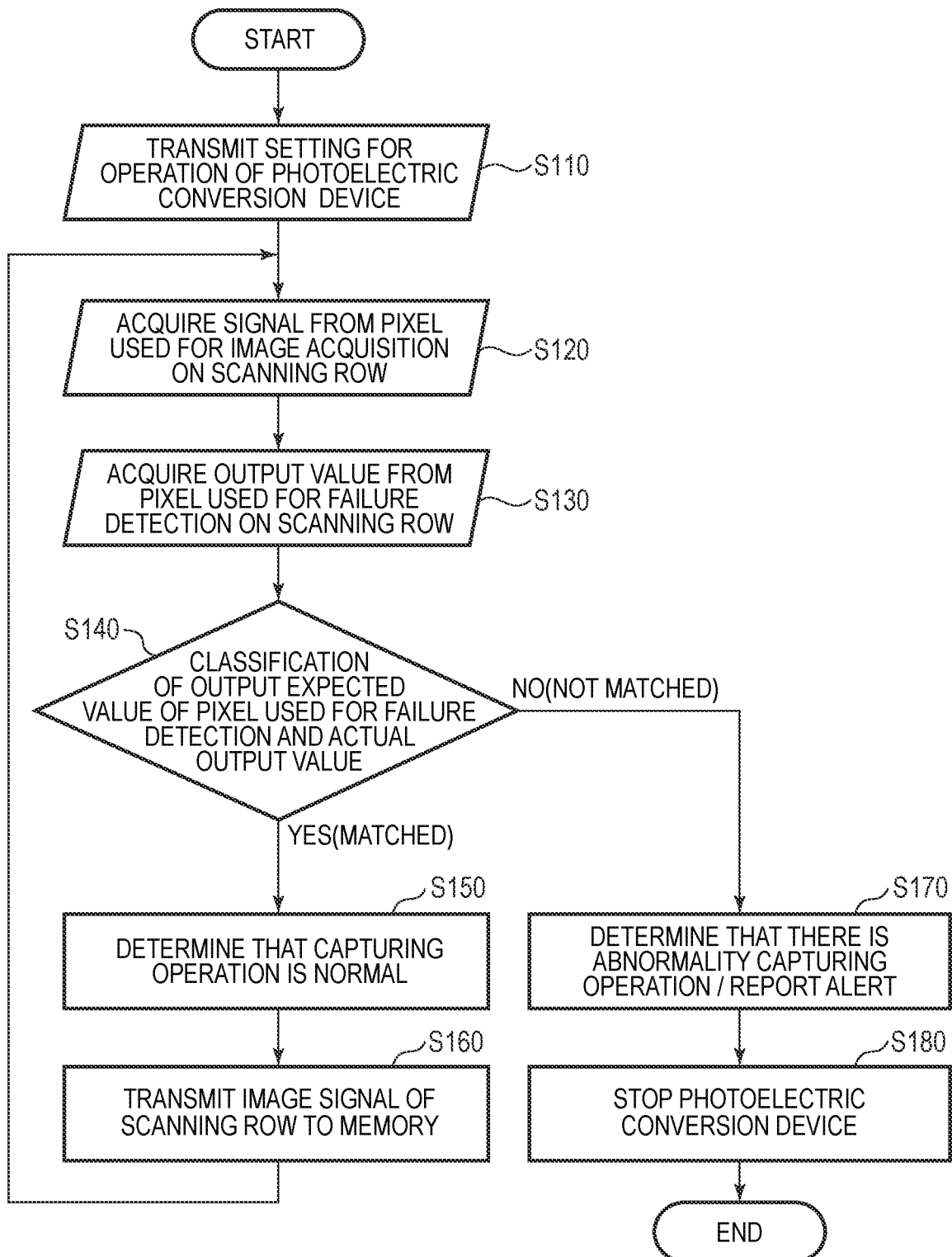
FIG. 16 is a flowchart illustrating the operation of the photodetection system according to the eighth embodiment of the present invention.

The endoscope 410 includes a lens barrel 412 in which an area of a predetermined length from the tip is inserted into the body cavity of the patient 472, and a camera head 414 connected to the base end of the lens barrel 412. Although FIG. 16 illustrates an endoscope 410 configured as a rigid mirror having a rigid lens barrel 412, the endoscope 410 may be configured as a flexible mirror having a flexible lens barrel. The endoscope 410 is held in a movable state by an arm 416.

An opening into which the objective lens is fitted is provided at the tip of the lens barrel 412. A light source device 434 is connected to the endoscope 410, and light generated by the light source device 434 is guided to the tip of the lens barrel 412 by a light guide extended inside the lens barrel 412, and is irradiated to an observation target in the body cavity of the patient 472 via an objective lens. The endoscope 410 may be a direct-viewing mirror, an oblique-viewing mirror, or a side-viewing mirror.

An optical system and a photoelectric conversion device (not illustrated) are provided inside the camera head 414, and reflected light (observation light) from the observation target is focused on the photoelectric conversion device by the optical system. The photoelectric conversion device photoelectrically converts the observation light and generates an electric signal corresponding to the observation light, i.e., an image signal corresponding to the observation image. As the photoelectric conversion device, the semiconductor device 100 described in any of the first to fourth embodiments may be used. The image signal is transmitted to the CCU 432 as RAW data.

The CCU 432 is configured by a CPU (Central Processing Unit), a GPU (Graphics Processing Unit), and the like, and integrally controls the operation of the endoscope 410 and the display device 440. Further, the CCU 432 receives an image signal from the camera head 414, and performs various types of image processing for displaying an image based on the image signal, such as development processing (demosaic processing), on the image signal.

The display device 440 displays an image based on the image signal subjected to the image processing by the CCU 432 under the control of the CCU 432.

The light source device 434 is configured by, for example, a light source such as an LED (Light Emitting Diode), and supplies irradiation light to the endoscope 410 when capturing an image of a surgical part or the like.

Input device 436 is an input interface for the endoscopic surgical system 400. The user may input various kinds of information and instructions to the endoscopic surgical system 400 via the input device 436.

The processing tool control device 438 controls the actuation of the energy processing tool 450 for tissue ablation, incision, blood vessel sealing, etc.

The light source device 434 for supplying the irradiation light to the endoscope 410 when capturing an image of the surgical part may be composed of a white light source composed of, for example, an LED, a laser light source, or a combination thereof. When a white light source is constituted by a combination of RGB laser light sources, since the output intensity and output timing of each color (each wavelength) may be controlled with high accuracy, the white balance of the captured image may be adjusted in the light source device 434. In this case, the observation object is irradiated with the laser light from each of the RGB laser light sources in a time division manner, and the driving of the imaging element of the camera head 414 is controlled in synchronization with the irradiation timing, whereby the images corresponding to the RGB light sources may be captured in a time division manner. According to this method, a color image may be obtained without providing a color filter in the imaging element.

Further, the driving of the light source device 434 may be controlled so as to change the intensity of the output light every predetermined time. By controlling the driving of the imaging element of the camera head 414 in synchronization with the timing of changing the intensity of the light to acquire images in a time-division manner and composing the images, it is possible to generate an image in a high dynamic range without so-called blocked up shadows and blown out highlights.

The light source device 434 may be configured to be capable of supplying light in a predetermined wavelength band corresponding to the special light observation. In special light observation, for example, wavelength dependency of light absorption in body tissue is utilized. Specifically, a predetermined tissue such as a blood vessel in the surface layer of the mucosa is imaged with high contrast by irradiating light in a narrower band compared to the irradiation light (i.e., white light) during normal observation. Alternatively, in special light observation, fluorescence observation for obtaining an image by fluorescence generated by irradiation with excitation light may be performed. In the fluorescence observation, the body tissue may be irradiated with excitation light to observe fluorescence from the body tissue, or a reagent such as indocyanine green (ICG) may be locally poured into the body tissue, and the body tissue may be irradiated with excitation light corresponding to the fluorescence wavelength of the reagent to obtain a fluorescence image. The light source device 434 may be configured to supply narrowband light and/or excitation light corresponding to such special light observation.

As described above, according to the present embodiment, by configuring the endoscopic surgical system using the semiconductor device according to any one of the first to fourth embodiments, it is possible to realize an endoscopic surgical system capable of acquiring images of better quality.

Eighth Embodiment

Figure 14A:
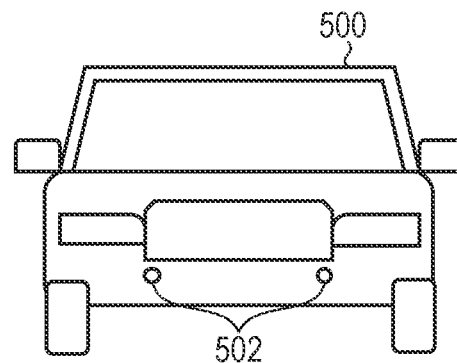
FIG. 14A, FIG. 14B, and FIG. 14C are schematic diagrams illustrating a configuration example of a movable object according to an eighth embodiment of the present invention.
Figure 14B:
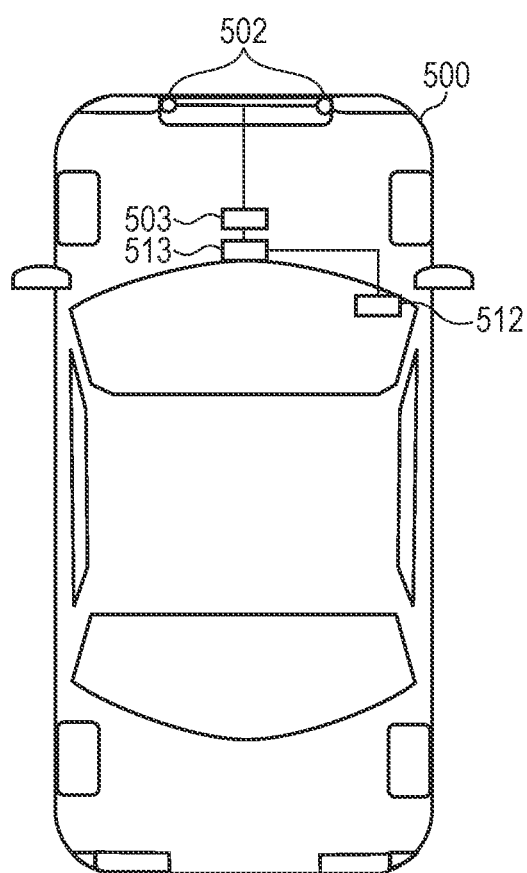
Figure 14C:
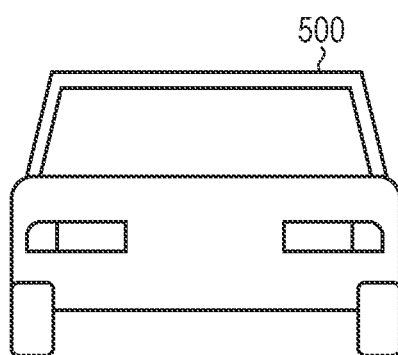
Figure 15:
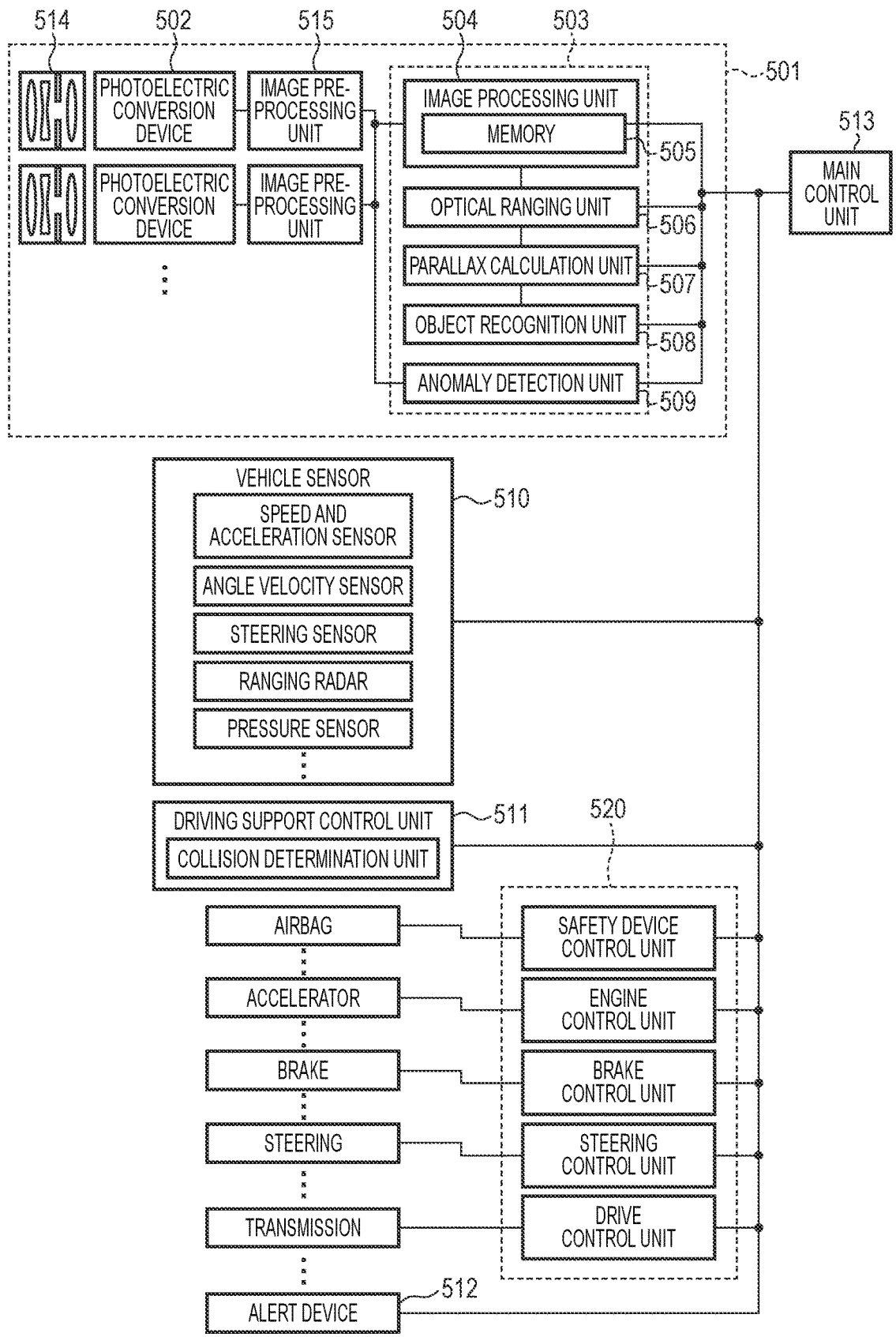
FIG. 15 is a block diagram illustrating a schematic configuration of a photodetection system according to the eighth embodiment of the present invention.

A photodetection system and a movable object according, to an eighth embodiment of the present invention will be described with reference to FIG. 14A to FIG. 16. FIG. 14A, FIG. 14B, and FIG. 14C are schematic diagrams illustrating a configuration example of a movable object according to the present embodiment. FIG. 15 is a block diagram illustrating a schematic configuration of a photodetection system according to the present embodiment. FIG. 16 is a flowchart illustrating the operation of the photodetection system according to the present embodiment. In the present embodiment, an application example to an on-vehicle camera will be described as a photodetection system to which the semiconductor device 100 according to any one of the first to fourth embodiments is applied.

FIG. 14A to FIG. 14C are schematic diagrams illustrating a configuration example of a movable object (a vehicle system) according to the present embodiment. FIG. 14A to FIG. 14C illustrate a configuration of a vehicle 500 (an automobile) as an example of a vehicle system incorporating the photodetection system to which the semiconductor device according to any one of the first to fourth embodiments is applied. FIG. 14A is a schematic front view of the vehicle 500, FIG. 14B is a schematic plan view of the vehicle 500, and FIG. 14C is a schematic rear view of the vehicle 500. The vehicle 500 includes a pair of photoelectric conversion devices 502 on the front side thereof. Here, the photoelectric conversion devices 502 are the semiconductor device 100 described in any of the first to fourth embodiments. The vehicle 500 includes an integrated circuit 503, an alert device 512, and a main control unit 513.

FIG. 15 is a block diagram illustrating a configuration example of a photodetection system 501 mounted on the vehicle 500. The photodetection system 501 includes a photoelectric conversion device 502, an image preprocessing unit 515, an integrated circuit 503, and an optical system 514. The photoelectric conversion device 502 is the semiconductor device 100 described in any of the first to fourth embodiments. The optical system 514 forms an optical image of an object on the photoelectric conversion device 502. The photoelectric conversion device 502 converts the optical image of the object formed by the optical system 514 into an electric signal. The image preprocessing unit 515 performs predetermined signal processing on the signal output from the photoelectric conversion device 502. The function of the image preprocessing unit 515 may be incorporated in the photoelectric conversion device 502. The photodetection system 501 is provided with at least two sets of the optical system 514, the photoelectric conversion device 502, and the image preprocessing unit 515, and outputs from the image preprocessing units 515 of each set are input to the integrated circuit 503.

The integrated circuit 503 is an integrated circuit for use in an imaging system, and includes an image processing unit 504, an optical ranging unit 506, a parallax calculation unit 507, an object recognition unit 508, and an abnormality detection unit 509. The image processing unit 504 processes the image signal output from the image preprocessing unit 515. For example, the image processing unit 504 performs image processing such as development processing and defect correction on the output signal of the image preprocessing unit 515. The image processing unit 504 includes a memory 505 for temporarily storing image signals. The memory 505 may store, for example, the position of a known defective pixel in the photoelectric conversion device 502.

The optical ranging unit 506 performs focusing and distance measurement of the object. The parallax calculation unit 507 calculates distance measurement information (distance information) from a plurality of image data (parallax images) acquired by a plurality of photoelectric conversion devices 502. Each of the photoelectric conversion devices 502 may have a configuration capable of acquiring various kinds of information such as distance information. The object recognition unit 508 recognizes an object such as a vehicle, a road, a sign, or a person. When the abnormality detection unit 509 detects an abnormality of the photoelectric conversion device 502, the abnormality detection unit 509 notifies the main control unit 513 of the abnormality.

The integrated circuit 503 may be implemented by dedicated hardware, software modules, or a combination thereof. Further, it may be implemented by FPGA (Field Programmable Gate Array), ASIC (Application Specific Integrated Circuit), or the like, or may be implemented by a combination of these.

The main control unit 513 collectively controls the operations of the photodetection system 501, the vehicle sensor 510, the control unit 520, and the like. The vehicle 500 may not include the main control unit 513. In this case, the photoelectric, conversion device 502, the vehicle sensor 510, and the control unit 520 transmit and receive control signals via a communication network. For example, the CAN (Controller Area Network) standard may be applied to transmit and receive the control signals.

The integrated circuit 503 has a function of receiving a control signal from the main control unit 513 or transmitting a control signal and a setting value to the photoelectric conversion device 502 by its own control unit.

The photodetection system 501 is connected to the vehicle sensor 510, and may detect a traveling state of the own vehicle such as a vehicle speed, a yaw rate, a steering angle, and the like, an environment outside the own vehicle, and states of other vehicles and obstacles. The vehicle sensor 510 is also a distance information acquisition means for acquiring distance information to an object. The photodetection system 501 is connected to a driving support control unit 511 that performs various driving support functions such as an automatic steering function, an automatic cruising function, and a collision prevention function. In particular, with regard to the collision determination function, based on the detection results of the photodetection system 501 and the vehicle sensor 510, it is determined whether or not there is a collision with another vehicle or an obstacle. Thus, avoidance control when a collision is estimated and activation of the safety device at the time of collision are performed.

The photodetection system 501 is also connected to an alert device 512 that issues an alert to the driver based on the determination result of the collision determination unit. For example, when the collision possibility is high as the determination result of the collision determination unit, the main control unit 513 performs vehicle control to avoid collision and reduce damage by braking, returning an accelerator, suppressing engine output, or the like. The alert device 512 alerts a user by sounding an alarm such as a sound, displaying alert information on a display screen of a car navigation system or a meter panel, or applying vibration to a seat belt or a steering wheel.

In the present embodiment, the photodetection system 501 images the periphery of the vehicle, for example, the front side or the rear side. FIG. 14B illustrates an example of the arrangement of the photodetection system 501 when the photodetection system 501 captures an image in front of the vehicle.

As described above, the photoelectric conversion device 502 is disposed in front of the vehicle 500. More specifically, when a center line with respect to a forward/backward direction of the vehicle 500 or an outer shape (e.g., a vehicle width) is regarded as a symmetry axis, and two photoelectric conversion devices 502 are disposed axisymmetrically with respect to the symmetry axis, it is preferable to acquire distance information between the vehicle 500 and an object to be imaged and to determine a collision possibility. Further, it is preferable that the photoelectric conversion device 502 is disposed so as not to obstruct the field of view of the driver when the driver sees a situation outside the vehicle 500 from the driver's seat. The alert device 512 is preferably arranged to be easy to enter the field of view of the driver.

Next, a failure detection operation of the photoelectric conversion device 502 in the photodetection system 501 will be described with reference to FIG. 16. The failure detection operation of the photoelectric conversion device 502 may be performed according to steps S110 to S180 illustrated in FIG. 16.

Step S110 is a step of performing setting at the time of startup of the photoelectric conversion device 502. That is, a setting for the operation of the photoelectric conversion device 502 is transmitted from the outside of the photodetection system 501 (for example, the main control unit 513) or from the inside of the photodetection system 501, and the imaging operation and the failure detection operation of the photoelectric conversion device 502 are started.

Next, in step S120, pixel signals are acquired from the effective pixels. In step S130, an output value from the failure detection pixel provided for failure detection is acquired. The failure detection pixel includes a photoelectric conversion element as in the case of the effective pixels. A predetermined voltage is written to the photoelectric conversion element. The failure detection pixel outputs a signal corresponding to the voltage written to the photoelectric conversion element. Step S120 and step S130 may be reversed.

Next, in step S140, a classification of the output expected value of the failure detection pixel and the actual output value from the failure detection pixel is performed. As a result of the classification in step S140, when the output expected value matches the actual output value, the process proceeds to step S150, it is determined that the imaging operation is normally performed, and the process proceeds to step S160. In step S160, the pixel signals of the scanning row are transmitted to the memory 505 to temporarily store them. After that, the process returns to step S120 to continue the failure detection operation. On the other hand, as a result of the classification in step S140, when the output expected value does not match the actual output value, the processing step proceeds to step S170. In step S170, it is determined that there is an abnormality in the imaging operation, and an alert is notified to the main control unit 513 or the alert device 512. The alert device 512 causes the display unit to display that an abnormality has been detected. Thereafter, in step S180, the photoelectric conversion device 502 is stopped, and the operation of the photodetection system 501 is terminated.

Although the present embodiment exemplifies the example in which the flowchart is looped for each row, the flowchart may be looped for each plurality of rows, or the failure detection operation may be performed for each frame. The alert of step S170 may be notified to the outside of the vehicle via the wireless network.

Further, in the present embodiment, the control in which the own vehicle does not collide with other vehicles has been described, but the present invention is also applicable to a control in which the own vehicle is automatically driven following another vehicle, a control in which the own vehicle is automatically driven so as not to go out of the lane, and the like. Further, the photodetection system 501 may be applied not only to a vehicle such as an own vehicle, but also to, for example, other movable objects (moving devices) such as a ship, an aircraft, or an industrial robot. In addition, the present invention may be applied not only to a movable object but also to equipment using object recognition in a wide range such as an intelligent transport system (ITS).

Ninth Embodiment

Figure 17A:
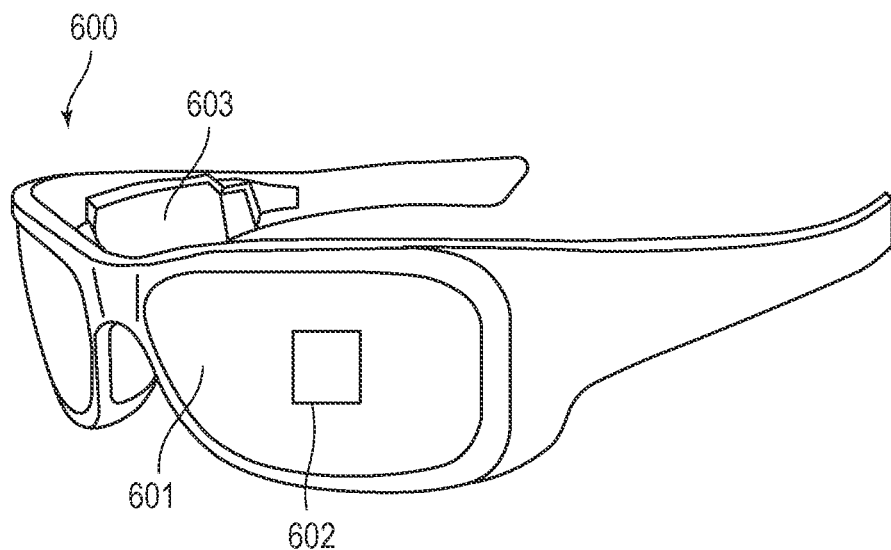
FIG. 17A and FIG. 17B are schematic diagrams illustrating a schematic configuration of a photodetection system according to a ninth embodiment of the present invention.
Figure 17B:
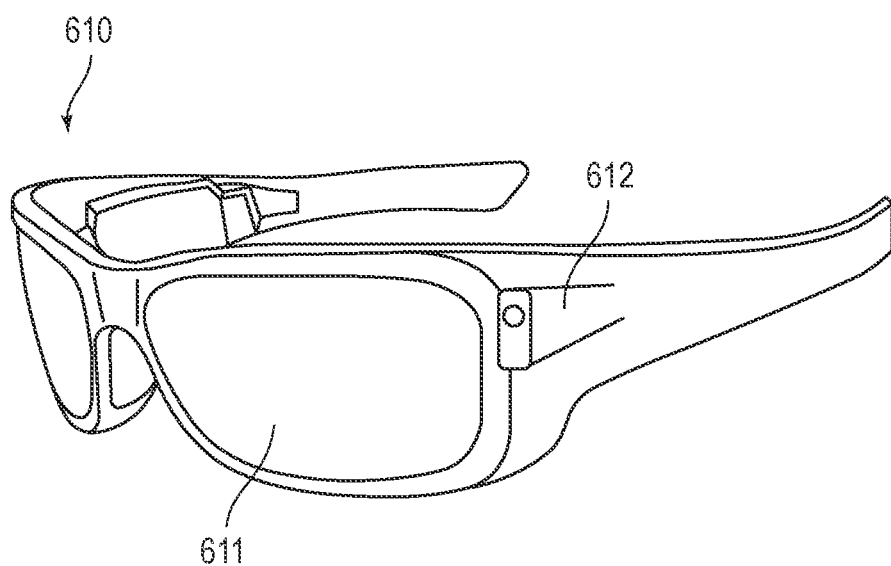

A photodetection system according to a ninth embodiment of the present invention will be described with reference to FIG. 17A and FIG. 17B. FIG. 17A and FIG. 17B are schematic diagrams illustrating a configuration example of the photodetection system according to the present embodiment. In the present embodiment, an application example to eyeglasses (smartglasses) will be described as a photodetection system to which the semiconductor device 100 according to any one of the first to fourth embodiments is applied.

FIG. 17A illustrates eyeglasses 600 (smartglasses) according to one application example. The eyeglasses 600 include a lens 601, a photoelectric conversion device 602, and a control device 603.

The photoelectric conversion device 602 is the semiconductor device 100 described in any of the first to fourth embodiments, and is provided in the lens 601. One photoelectric conversion device 602 or a plurality of photoelectric conversion devices 602 may be provided. When a plurality of photoelectric conversion devices 602 is used, a plurality of types of photoelectric conversion devices 602 may be used in combination. The arrangement position of the photoelectric conversion device 602 is not limited to that illustrated in FIG. 17A. A display device (not illustrated) including a light emitting device such as an OLED or an LED may be provided on the rear surface side of the lens 601.

The control device 603 functions as a power supply for supplying power to the photoelectric conversion device 602 and the display device. The control device 603 has a function of controlling the operations of the photoelectric conversion device 602 and the display device. The lens 601 is provided with an optical system for focusing light on the photoelectric conversion device 602.

FIG. 17B illustrates eyeglasses 610 (smartglasses) according to another application example. The eyeglasses 610 include a lens 611 and a control device 612. A photoelectric conversion device corresponding to the photoelectric conversion device 602 and a display device (not illustrated) may be mounted on the control device 612.

The lens 611 is provided with a photoelectric conversion device in the control device 612 and an optical system for projecting light from the display device, and an image is projected thereon. The control device 612 functions as a power supply for supplying power to the photoelectric conversion device and the display device, and has a function of controlling the operations of the photoelectric conversion device and the display device.

The control device 612 may further include a line-of-sight detection unit that detects the line of sight of the wearer. In this case, an infrared light emitting unit is provided in the control device 612, and infrared light emitted from the infrared light emitting unit may be used for detection of a line of sight. Specifically, the infrared light emitting unit emits infrared light to the eyeball of the user who is watching the display image. The reflected light of the emitted infrared light from the eyeball is detected by the imaging unit having the light receiving element, whereby a captured image of the eyeball is obtained. By providing a reduction unit that reduces light from the infrared light emitting unit to the display unit in a plan view, a decrease in image quality may be reduced.

The line of sight of the user with respect to the display image may be detected from the captured image of the eyeball obtained by capturing the infrared light. Any known method may be applied to the line-of-sight detection using the captured image of the eyeball. As an example, a line-of-sight detection method based on a Purkinje image caused by reflection of irradiation light on the cornea may be used. More specifically, a line-of-sight detection processing based on the pupil cornea reflection method is performed. By using the pupil cornea reflection method, a line-of-sight vector representing the direction (rotation angle) of the eyeball is calculated based on the image of the pupil image and the Purkinje image included in the captured image of the eyeball, whereby the line-of-sight of the user is detected.

The display device according to the present embodiment may include a photoelectric conversion device having a light receiving element, and may be configured to control a display image based on line-of-sight information of a user from the photoelectric conversion device. Specifically, the display device determines a first viewing area to be gazed by the user and a second viewing area other than the first viewing area based on the line-of-sight information. The first viewing area and the second viewing area may be determined by a control device of the display device, or may be determined by an external control device. When an external control device determines, the determination result is transmitted to a display device via communication. In the display region of the display device, the display resolution of the first viewing area may be controlled to be higher than the display resolution of the second viewing area. That is, the resolution of the second viewing area may be lower than the resolution of the first viewing area.

Further, the display area may have a first display area and a second display area different from the first display area, and may be configured to determine an area having a high priority from the first display area and the second display area based on the line-of-sight information. The first display area and the second display area may be determined by a control device of the display device, or may be determined by an external control device. When an external control device determines, the determination result is transmitted to a display device via communication. The resolution of the area with high priority may be controlled to be higher than the resolution of the region other than the area with high priority. That is, the resolution of the area having a relatively low priority may be reduced.

An AI (Artificial intelligence) may be used to determine the first viewing area or the area with high priority. The AI may be a model configured to estimate an angle of a line of sight and a distance to a target object ahead of the line of sight from an image of an eyeball, using an image of the eyeball and a direction in which the eyeball of the image is actually viewed as teacher data. The AI program may be held by a display device, a photoelectric conversion device, or an external device. When the external device has, the information is transmitted to the display device via communication.

When the display control is performed based on the visual recognition detection, the present invention may be preferably applied to smartglasses which further includes a photoelectric conversion device for capturing an image of the outside. The smartglasses may display captured external information in real time.

Modified Embodiments

The present invention is not limited to the above-described embodiments, and various modifications are possible.

For example, an example in which some of the configurations of any of the embodiments are added to other embodiments or an example in which some of the configurations of any of the embodiments are substituted with some of the configurations of the other embodiments is also an embodiment of the present invention.

The configurations of the pixel circuit P and the signal generation circuit described in the first to fourth embodiments and the operation timings thereof are not limited to those described in the embodiments. For example, the configuration of each logic circuit and the configuration of the first control circuit 20 may be different from each other, and the operation timing may be appropriately changed.

The first control signal pCLK and the second control signal pCNTEN_B supplied to the pixel circuit P and the signal generation circuit T may be inverted signals of the signals described in the above embodiment. In this case, the logic circuits constituting the pixel circuit P and the signal generation circuit T may be appropriately changed in accordance with the waveforms of these control signals.

The photodetection systems described in the fifth to ninth embodiments are examples of photodetection systems to which the semiconductor device of the present invention may be applied, and the photodetection system to which the semiconductor device of the present invention may be applied is not limited to the configurations illustrated in FIG. 11 to FIG. 17B.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-171585, filed Oct. 20, 2021 which is hereby incorporated by reference herein in its entirety.

What is claimed is:

1. A semiconductor device comprising:
a region provided with a plurality of circuit blocks each including an avalanche photodiode,
wherein a part of the plurality of circuit blocks is a pixel circuit that further includes a first control circuit configured to control the avalanche photodiode to a standby state in which an avalanche multiplication is possible and a recharging state in which the avalanche photodiode is returned to a state in which the avalanche multiplication is possible after the avalanche multiplication occurs, in response to a first control signal,
wherein another part of the plurality of circuit blocks is a signal generation circuit configured to generate a signal according to a waveform of the first control signal,
wherein the signal generation circuit is configured not to output a signal corresponding to an output of the avalanche photodiode,
wherein the pixel circuit further includes a second control circuit configured to count the number of periods during which the avalanche multiplication occurs in the avalanche photodiode among periods defined by intervals of pulses on the first control signal, and
wherein the signal generation circuit includes a third control circuit configured to count the number of periods defined by the intervals of the pulses on the first control signal.

2. The semiconductor device according to claim 1 further comprising a first signal line connected to the pixel circuit and the signal generation circuit and configured to supply the first control signal common to the pixel circuit and the signal generation circuit.

3. The semiconductor device according to claim 1,
wherein the plurality of circuit blocks includes a plurality of signal generation circuits, and
wherein the semiconductor device further includes a first signal line connected to each of the plurality of signal generation circuits and configured to supply the first control signal common to the plurality of signal generation circuits.

4. The semiconductor device according to claim 1, wherein the signal generation circuit is configured to generate a signal corresponding to a waveform of the first control signal and a waveform of a second control signal corresponding to an exposure period of the avalanche photodiode.

5. The semiconductor device according to claim 4, further comprising a signal line connected to the pixel circuit and the signal generation circuit and configured to supply the second control signal common to the pixel circuit and the signal generation circuit.

6. The semiconductor device according to claim 4,
wherein the plurality of circuit blocks includes a plurality of signal generation circuits, and
wherein the semiconductor device further includes a signal line connected to the plurality of signal generation circuits and configured to supply the control signal common to the plurality of signal generation circuits.

7. The semiconductor device according to claim 1, wherein a count period in the second control circuit and a count period in the third control circuit are defined by the first control signal and a second control signal corresponding to an exposure period of the avalanche photodiode.

8. The semiconductor device according to claim 7, wherein the count period of the second control circuit and the count period of the third control circuit are defined by the first control signal, the second control signal, and a reset signal for resetting count values of the second control circuit and the third control circuit.

9. The semiconductor device according to claim 1, wherein the avalanche photodiode and the third control circuit of the signal generation circuit are electrically disconnected from each other.

10. The semiconductor device according to claim 1,
wherein the plurality of circuit blocks is arranged across a plurality of rows and a plurality of columns, and
wherein the pixel circuit and the signal generation circuit are arranged in the same row.

11. The semiconductor device according to claim 3,
wherein the plurality of circuit blocks is arranged across a plurality of rows and a plurality of columns, and
wherein the plurality of signal generation circuits is arranged in the same row.

12. The semiconductor device according to claim 1, wherein the signal generation circuit includes the same circuit elements as the circuit elements constituting the pixel circuit.

13. A photodetection system comprising:
  the semiconductor device according to claim 1; and
  a signal processing device configured to process a signal output from the semiconductor device.

14. The photodetection system according to claim 13, wherein the signal processing device is configured to generate a distance image representing distance information to an object based on the signal.

* * * * *